(12) United States Patent
Tsuji et al.

(10) Patent No.: US 7,244,299 B2
(45) Date of Patent: Jul. 17, 2007

(54) INK JET RECORDING INK, INK JET RECORDING METHOD, INK CARTRIDGE, AND INK JET RECORDING APPARATUS

(75) Inventors: Itaru Tsuji, Kawasaki (JP); Shinichi Tochihara, Hadano (JP); Hiroshi Tomioka, Tokyo (JP); Koichi Osumi, Tokyo (JP); Hiroyuki Takuhara, Tokyo (JP); Minako Kawabe, Kawasaki (JP); Hideki Yamakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/234,307

(22) Filed: Sep. 26, 2005

(65) Prior Publication Data

US 2006/0011097 A1 Jan. 19, 2006

Related U.S. Application Data

(63) Continuation of application No. PCT/JP2005/007193, filed on Apr. 7, 2005.

(30) Foreign Application Priority Data

Apr. 8, 2004 (JP) ............................. 2004-114669
Apr. 8, 2004 (JP) ............................. 2004-114670

(51) Int. Cl.
*C09D 11/02* (2006.01)
*B41J 2/01* (2006.01)

(52) U.S. Cl. ................ 106/31.48; 106/31.43; 106/31.47; 106/31.49; 106/31.58; 347/100

(58) Field of Classification Search ............. 106/31.48, 106/31.49, 31.58, 31.47, 31.43; 347/100
See application file for complete search history.

(56) References Cited

U.S. PATENT DOCUMENTS

| | | | |
|---|---|---|---|
| 4,167,509 A * | 9/1979 | Parton ........................ | 534/606 |
| 4,923,515 A | 5/1990 | Koike et al. ................... | 106/22 |
| 4,973,499 A | 11/1990 | Iwata et al. ................. | 427/261 |
| 4,986,850 A | 1/1991 | Iwata et al. ................... | 106/25 |
| 5,078,790 A | 1/1992 | Tochihara et al. ............ | 106/20 |
| 5,080,716 A | 1/1992 | Aoki et al. .................... | 106/20 |
| 5,099,255 A | 3/1992 | Koike et al. ................. | 346/1.1 |
| 5,101,217 A | 3/1992 | Iwata et al. .................. | 346/1.1 |
| 5,125,969 A | 6/1992 | Nishiwaki et al. ............ | 106/22 |
| 5,131,949 A | 7/1992 | Tochihara et al. ............ | 106/20 |
| 5,132,700 A | 7/1992 | Tochihara et al. ........... | 106/20 |
| 5,135,571 A | 8/1992 | Shirota et al. ................ | 106/22 |
| 5,137,570 A | 8/1992 | Nishiwaki et al. ............ | 106/22 |
| 5,148,186 A | 9/1992 | Tochihara et al. ........... | 346/1.1 |
| 5,213,613 A | 5/1993 | Nagashima et al. ....... | 106/20 R |
| 5,256,194 A | 10/1993 | Nishiwaki et al. ............ | 106/22 |
| 5,258,066 A | 11/1993 | Kobayashi et al. ........ | 106/22 R |
| 5,296,022 A | 3/1994 | Kobayashi et al. ........... | 106/20 |
| 5,395,434 A | 3/1995 | Tochihara et al. ......... | 106/22 R |
| 5,409,529 A | 4/1995 | Nagashima et al. ...... | 106/22 H |
| 5,476,541 A | 12/1995 | Tochihara ................. | 106/22 K |
| 5,478,383 A | 12/1995 | Nagashima et al. ...... | 106/22 R |
| 5,482,545 A | 1/1996 | Aoki et al. ................ | 106/22 R |
| 5,485,188 A | 1/1996 | Tochihara et al. .......... | 347/100 |
| 5,733,363 A | 3/1998 | Nagashima et al. ..... | 106/31.43 |
| 5,733,637 A | 3/1998 | Moriya et al. .............. | 428/207 |
| 5,738,932 A | 4/1998 | Kondo et al. ............... | 428/195 |
| 5,804,320 A | 9/1998 | Tomioka et al. ......... | 428/478.2 |
| 5,835,116 A | 11/1998 | Sato et al. ..................... | 347/98 |
| 5,933,164 A | 8/1999 | Sato et al. ..................... | 347/43 |
| 5,936,649 A | 8/1999 | Ikeda et al. ................... | 347/87 |
| 5,955,185 A | 9/1999 | Yoshino et al. .......... | 428/304.4 |
| 5,965,252 A | 10/1999 | Santo et al. ................ | 428/329 |
| 5,976,233 A | 11/1999 | Osumi et al. ............. | 106/31.86 |
| 5,989,650 A | 11/1999 | Inamoto et al. ............. | 427/487 |
| 6,003,987 A | 12/1999 | Yamamoto et al. ......... | 347/100 |
| 6,221,141 B1 | 4/2001 | Takada et al. ............. | 106/31.6 |
| 6,280,513 B1 | 8/2001 | Osumi et al. .............. | 106/31.6 |
| 6,332,919 B2 | 12/2001 | Osumi et al. .............. | 106/31.6 |
| 6,342,095 B1 | 1/2002 | Takizawa et al. ........ | 106/31.27 |
| 6,375,317 B1 | 4/2002 | Osumi et al. ............... | 347/100 |
| 6,425,662 B1 | 7/2002 | Teraoka et al. ............ | 347/100 |

| | | | |
|---|---|---|---|
| 6,460,989 B1 | 10/2002 | Yano et al. | 347/101 |
| 6,474,804 B2 | 11/2002 | Osumi et al. | 347/100 |
| 6,488,752 B1 | 12/2002 | Kenworthy et al. | 106/31.48 |
| 6,506,239 B1 | 1/2003 | Osumi et al. | 106/31.6 |
| 6,511,534 B1 | 1/2003 | Mishina et al. | 106/31.33 |
| 6,517,199 B1 | 2/2003 | Tomioka et al. | 347/101 |
| 6,521,034 B1 | 2/2003 | Osumi et al. | 106/31.6 |
| 6,533,852 B2 * | 3/2003 | Hirose | 106/31.48 |
| 6,533,853 B1 | 3/2003 | Mishina et al. | 106/31.6 |
| 6,536,890 B1 | 3/2003 | Kato et al. | 347/100 |
| 6,540,329 B1 | 4/2003 | Kaneko et al. | 347/43 |
| 6,547,381 B2 | 4/2003 | Watanabe et al. | 347/100 |
| 6,558,740 B1 | 5/2003 | Santo et al. | 427/146 |
| 6,565,950 B1 | 5/2003 | Tomioka et al. | 428/195 |
| 6,572,692 B1 | 6/2003 | Osumi et al. | 106/31.6 |
| 6,619,791 B2 | 9/2003 | Tochihara et al. | 347/100 |
| 6,659,601 B2 | 12/2003 | Goto et al. | 347/100 |
| 6,685,999 B2 | 2/2004 | Ichinose et al. | 428/31.27 |
| 6,706,104 B2 | 3/2004 | Takuhara et al. | 106/31.6 |
| 6,719,420 B2 | 4/2004 | Tomioka et al. | 347/100 |
| 6,723,835 B1 * | 4/2004 | Millard et al. | 534/772 |
| 6,729,718 B2 | 5/2004 | Goto et al. | 347/100 |
| 6,733,120 B2 | 5/2004 | Ogasawara et al. | 347/100 |
| 6,746,114 B2 | 6/2004 | Takahashi et al. | 347/100 |
| 6,773,101 B2 | 8/2004 | Tochihara et al. | 347/100 |
| 6,780,901 B1 | 8/2004 | Endo et al. | 523/160 |
| 6,821,328 B2 | 11/2004 | Tomioka et al. | 106/31.33 |
| 6,830,709 B2 | 12/2004 | Tomioka et al. | 252/506 |
| 6,863,391 B2 | 3/2005 | Tomioka et al. | 347/100 |
| 6,966,944 B2 | 11/2005 | Shimomura et al. | 106/31.43 |
| 7,025,817 B2 | 4/2006 | Kanke et al. | 106/31.51 |
| 2003/0136301 A1 | 7/2003 | Shawcross et al. | 106/31.48 |
| 2004/0244622 A1 | 12/2004 | Ichinose et al. | 101/491 |
| 2005/0057607 A1 | 3/2005 | Tomioka et al. | 347/43 |
| 2005/0284332 A1 | 12/2005 | Shinjo et al. | 106/31.27 |
| 2006/0011097 A1 | 1/2006 | Tsuji et al. | 106/31.48 |
| 2006/0065157 A1 * | 3/2006 | Kawabe et al. | 106/31.48 |
| 2006/0137569 A1 | 6/2006 | Osumi et al. | 106/31.13 |
| 2006/0137570 A1 | 6/2006 | Osumi et al. | 106/31.27 |
| 2006/0139428 A1 | 6/2006 | Osumi et al. | 347/100 |
| 2006/0139429 A1 | 6/2006 | Osumi et al. | 347/100 |
| 2006/0152570 A1 | 7/2006 | Ishikawa et al. | 347/105 |
| 2006/0192827 A1 | 8/2006 | Takada et al. | 347/100 |
| 2006/0194056 A1 | 8/2006 | Nagashima et al. | 428/403 |
| 2006/0194897 A1 | 8/2006 | Kawabe et al. | 523/160 |
| 2006/0196389 A1 | 9/2006 | Tsuji et al. | 106/31.43 |

FOREIGN PATENT DOCUMENTS

| | | |
|---|---|---|
| EP | 0 724 968 A1 | 8/1996 |
| JP | 2-173168 | 7/1990 |
| JP | 7-228810 | 8/1995 |
| JP | 8-267903 | 10/1996 |
| JP | 9-169111 | 6/1997 |
| JP | 2002-504613 | 2/2002 |
| JP | 2006/071822 * | 3/2006 |
| WO | WO 99/43754 | 9/1999 |
| WO | WO 01/66651 A1 | 9/2001 |

OTHER PUBLICATIONS

Derwent abstract of JP2006/071822, Mar. 2006.*
Oct. 19, 2006 International Preliminary Report on Patentability and Written Opinion in PCT/JP2005/007193.

* cited by examiner

*Primary Examiner*—Helene Klemanski
(74) *Attorney, Agent, or Firm*—Fitzpatrick, Cella, Harper & Scinto

(57) ABSTRACT

An ink jet recording ink comprising at least a copper phthalocyanine dye represented by the following general formula (1) and a compound represented by the following general formula (2):

General formula (1)

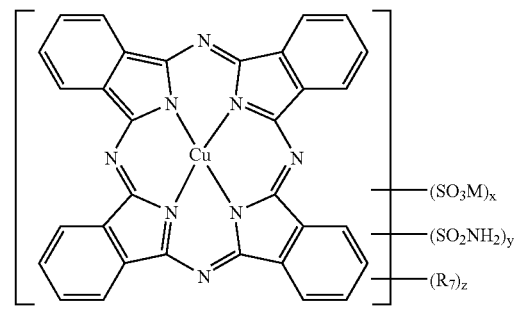

General formula (2)

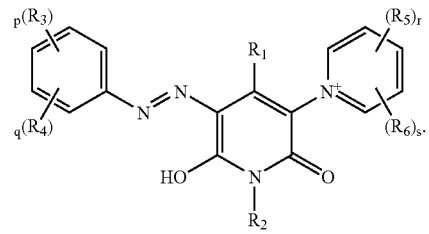

13 Claims, 10 Drawing Sheets

INK JET RECORDING INK, INK JET RECORDING METHOD, INK CARTRIDGE, AND INK JET RECORDING APPARATUS

This application is a continuation of International Application No. PCT/JP2005/007193, filed Apr. 7, 2005, which claims the benefit of Japanese Patent Application Nos. 2004-114669 and 2004-114670 filed on Apr. 8, 2004.

BACKGROUND OF THE INVENTION

1. Field of the Invention

The present invention relates to an ink jet recording ink, an ink jet recording method, an ink cartridge, and an ink jet-recording apparatus.

2. Related Background Art

The use of a dye as a recording agent (colorant in a recording solution) has conventionally involved a problem in that a so-called bronzing occurs. In the bronzing, the crystal of the dye is separated out on paper as a recorded image dries, and the recorded image reflects light to glow in a yellow or brown color, thereby emitting metallic luster. The occurrence of the bronzing involves the reflection of light, thereby leading to not only a reduction in density of the recorded image but also the considerable deviation of the color tone from that required for ink.

The addition of an alkanolamine such as N-hydroxyethylmorpholine, monoethanolamine, diethanolamine, or triethanolamine has been known to prevent the bronzing. However, the addition of even a small amount of any one of those alkanolamines to ink provides the ink with a high pH of 9 or more. An ink having such high pH is problematic in terms of ejection stability owing to, for example, the corrosion of a nozzle into which the ink is to be in contact. Furthermore, the ink involves a problem in terms of safety when a person erroneously touches the ink at the time of handling. An ink having a pH in a neutral region (a pH around 7) has been desired because the ink gives little damage when it erroneously enters an eye, and because it has a high degree of freedom of selection of a member to be in contact with the ink. The addition of any one of those alkanolamines to ink also involves a problem in that water resistance reduces even if the bronzing is suppressed.

The addition of paratoluenesulfonic amide ethylene oxide to ink had a certain effect on the bronzing, but reduced a contact-angle between the ink and a recording medium. As a result, feathering occurred, an optical density (OD) reduced, and hence printing quality remarkably deteriorated. The addition of a basic amino acid to ink has also been investigated. However, in this case, the addition amount must be at least 1 mass % to 2 mass %, and the ink may have a pH of 8 or more depending on the solvent composition of the ink although the pH does not become extraordinarily high. Accordingly, the ink cannot be said to be an ink having a pH in a neutral region. In addition, the corrosion or the like of a nozzle with which the ink is to be in contact has been concerned (see, for example, JP-A-No. H07-228810).

In recent years, a dye particularly excellent in weatherability has been used. However, in the case of a copper phthalocyanine dye in particular, a trade-off relation is established between the weatherability and the occurrence of the bronzing.

An ink used for an ink jet recording apparatus such as an ink jet printer is prepared by selecting an optimum material from a large number of materials. When attention is paid to, for example, a dye alone, the dye may be a direct dye, an acid dye, or the like each of which has different characteristics. For example, when printing is performed with an ink using a direct dye, a formed image is characterized in that it is relatively excellent in weatherability. When printing is performed with an ink using an acid dye, a printed product having high brightness and high chroma is obtained.

An ink jet recording ink is requested to have properties including the following properties. For example, (1) the ink does not cause clogging at the tip of a nozzle, (2) the ink can secure stable recording even at the time of continuous recording or even when recording is restarted after the ink has been left standing over a long period of time (the ink has start-up ejection stability or stick recoverability), and (3) the physical properties of the ink do not change even when the ink is stored for a long period of time.

The addition of urea, a derivative of urea, thiourea, a derivative of thiourea, or the like as a humectant to ink has been conventionally performed to prevent clogging of the tip of a nozzle due to the evaporation of water. The addition of urea or a derivative thereof as a solubilizing agent for a dye to ink has also been performed for increasing the solubility of the dye into water or various solvents with a view to improving start-up ejection stability (see, for example, JP-A-No. H02-173168).

However, some of the dyes may generate an aggregate or decompose owing to an ammonium ion generated by the decomposition of urea. Accordingly, the storage of an ink added with urea for a long period of time has involved a problem in that a precipitate is generated as a result of aggregation of the dye, and clogging occurs at an ink ejection port of an ink jet recording apparatus, in an ink supply nozzle thereof, and at any other location. Furthermore, an ink added with urea may cause a metal portion to be corroded by ammonia generated by the decomposition of urea regardless of the kind of a colorant, and the odor of the generated ammonia may provide a user with a sense of displeasure.

By the way, according to the conventional ink jet method, an ink having a viscosity as low as 1 to 3 mPa·s is ejected from nozzles or openings having small diameter of about 30 to 50 μm. In other words, the nozzles or openings can be replenished (refilled) with the ink at high speed to cope with a reduction in ink amount in the nozzles or openings due to the ejection of the ink because the ink has a sufficiently low viscosity. In this case, the meniscuses (the interface between the ink and the air) of the tip of the nozzles or the openings are recovered quickly, whereby ejection stability can be obtained even when high speed printing with a repetitive printing frequency in excess of 10 kHz is performed.

However, when a image is printed on a recording medium such as plain paper by means of an ink having a low viscosity, feathering occurs along the fiber of the paper because the ink penetrates into the recording medium quickly. The feathering itself provides a sense of roughness to reduce image quality. In addition, when adjacent dots are coupled owing to feathering, only such portion has reduced resolution, thereby causing a problem in that image quality extremely reduces. To solve those problems, the penetration rate of an ink into a recording medium is suppressed by, for example, controlling the surface tension of the ink. However, in the case where a color image is formed by means of an ink with the suppressed penetration rate, when inks having different colors come into contact with each other as a result of allowing them to impinge on a recording medium, color mixing feathering (bleeding) occurs to thereby significantly reduce image quality.

With regard to the above-described problems occurring when an ink having a low viscosity is used, an ink having a high viscosity is used to reduce the penetration rate of the ink into a recording medium, whereby feathering can be prevented. In this case, mixing rate of different colors is also suppressed, so color mixing can be prevented. Therefore, the use of an ink having a high viscosity is very useful in solving the above problems.

As a recording apparatus using an ink jet method has become widespread, the applications of the apparatus have been rapidly expanding. With the advent of the expansion, kinds of recording media have also become miscellaneous. The recording apparatus is further expected to be applicable to liquid nonabsorbing media such as metal, plastic, and glass in addition to paper. Therefore, the realization of an ink jet recording apparatus capable of using an ink having a high viscosity has been demanded.

However, in the conventional ink jet method, a flow path resistance increases as the viscosity of ink increases, with the result that the supply rate of an ink to nozzles or openings remarkably reduces. In this case, energy necessary for ejecting the ink also remarkably increases in accordance with the increase in the flow path resistance. For example, when an ink having a high viscosity is used in an ink jet apparatus that generally uses a commercially available aqueous ink (having a viscosity of 1 to 3 mPa·s), a nozzle or opening cannot be supplied with the ink without delay, and meniscuses cannot be recovered without delay when the viscosity of the ink exceeds about 10 mPa·s.

When one attempts to ejection an ink in such state, the ink is ejected from an unstable meniscus position. As a result, fluctuations in the ejection amount and ejection direction of the ink enlarge to reduce image quality. Furthermore, nozzles or openings cannot be supplied with the ink without delay when the viscosity of the ink exceeds 20 mPa·s, with the result that omission of ejection occurs. Furthermore, when the viscosity of the ink exceeds 100 mPa·s, even if the nozzles or openings can be supplied with the ink without delay, conventional pressure generating means does not generate sufficient energy for ejecting the ink, with the result that the ink is ejected unstably or is not ejected at all.

In view of the above, a printer intended for performing printing at high speed, which has a large nozzle diameter of about 50 µm to 70 µm to reduce a flow path resistance and uses an ink having a viscosity as high as 10 to 100 mPa·s, has been proposed (see, for example, JP-A-No. H09-169111). In this method, the supply rate of the ink reduces unless the nozzle diameter is increased by an amount corresponding to an increase in viscosity of the ink, so a repetitive printing frequency reduces. However, when the nozzle diameter is increased, the diameter of an ink droplet to be ejected relatively increases, thereby leading to reductions in resolution and image quality.

SUMMARY OF THE INVENTION

As described above, an ink jet recording ink capable of suppressing the bronzing and satisfying various properties requested for the ink jet recording ink has not been obtained yet.

Therefore, a first object of the present invention is to provide an ink jet recording ink which is capable of preventing a bronzing, which is excellent in weatherability such as gas resistance, and which does not corrode or deteriorate a member to be in contact with the ink such as a recording head or a nozzle.

In a recent trend for high image quality in an ink jet recording technique, a recording head has been used for the purpose of reducing graininess, which has nozzles having a diameter that is much finer than those in the conventional ink jet technique, specifically, a nozzle diameter of less than 20 µm; and a liquid droplet volume of less than 4.5 pl. In such extremely fine nozzle, a tendency is observed, in which an influence of clogging becomes more significant, and, at the same time, start-up ejection stability significantly deteriorates. The inventors of the present invention have made studies to find that the tendency becomes significant as the temperature reduces even in a low-humidity environment, and the start-up ejection stability significantly deteriorates in an environment of 15° C. or lower, thereby impairing printing quality.

Accordingly, a second object of the present invention is to provide an ink jet recording ink which satisfies the first object, which does not cause clogging in nozzles or openings of an ink jet recording apparatus and does not cause inconvenience such as failure in discharge of an ink droplet from a recording head when the ink is used for an ink jet recording method, which provides good start-up ejection stability and good stick recoverability comparable to those of conventional ink jet inks containing added urea or a derivative thereof, which does not cause a change in color tint or aggregation due to decomposition of a dye, which is excellent in long-term storage stability and discharge stability, and which has an appropriate viscosity such that a printed product having high resolution and high image quality can be created.

Another object of the present invention is to provide an ink jet recording method, an ink cartridge, and an ink jet recording apparatus each of which uses the ink jet recording ink.

The inventors of the present invention have made extensive studies with a view to achieving the above objects. As a result, they have found a technique beyond imagination in terms of the prior art. That is, a suppressive effect on the occurrence of bronzing can be improved by adding a specific compound to the ink with nearly no changes in physical properties such as pH in addition to a method of obtaining a preventing effect on bronzing which involves incorporating an amine-based additive or the like to the ink or increasing pH to increase the solubility of a copper phthalocyanine dye.

To be specific, the inventors have found that the use of a compound represented by the following general formula (2) in combination with a copper phthalocyanine dye can prevent a bronzing. Thus, they have completed the present invention.

It has been generally known that, even in dyes having the same color index (C.I.) number, the position and size of a peak of an absorption spectrum change in accordance with changes in kinds, positions, and number of substituents. For example, in a copper phthalocyanine dye having peaks of an absorption spectrum in both the wavelength range of 600 nm to 640 nm and the wavelength range of 650 nm to 680 nm, a ratio between peak values of the peaks in these two ranges differs depending on dyes. The difference results from differences in kinds, positions, and number of substituents of the copper phthalocyanine dye.

There generally tends to exist a strong correlation between the number and ratio of substituents causing the copper phthalocyanine dye to absorb light in the wavelength range of 650 nm to 680 nm and weatherability such as gas resistance of a printed product or the occurrence of a bronzing. That is, as the number of substituents absorbing light in the wavelength range of 650 nm to 680 nm reduces, the copper phthalocyanine dye is excellent in weatherability such as gas resistance, but a bronzing is apt to occur. In other words, an ink having a small peak value of an absorption spectrum in the wavelength range of 650 nm to 680 nm is excellent in weatherability such as gas resistance, but is apt to cause a bronzing.

In view of the above, the present invention provides ink jet recording inks described below (which may hereinafter be simply referred to as inks) as means for solving the above problems.

According to one aspect of the present invention, there is provided an ink jet recording ink, characterized by containing at least a copper phthalocyanine dye represented by the following general formula (1) and a compound represented by the following general formula (2).

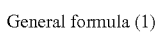

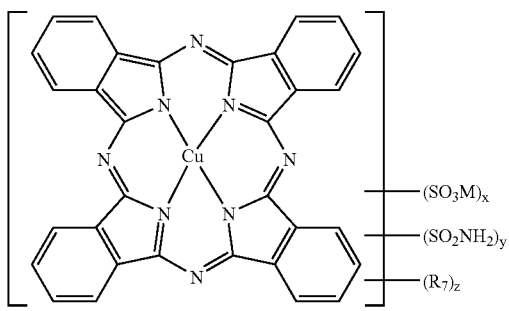

(In the general formula (1), M represents an alkali metal or ammonium, $R_7$ represents OH, COOM, or $R_8$COOM (where $R_8$ represents an alkyl group having 4 to 9 carbon atoms, and M represents an alkali metal or ammonium), and x, y, and z each independently represent an integer of 0 to 4.)

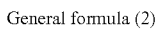

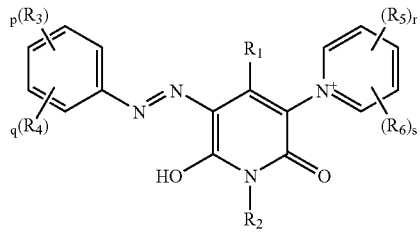

(In the general formula (2), $R_1$ and $R_2$ each independently represent a substituted or unsubstituted alkyl group, aryl group, or arylalkyl group, or a hydrogen atom, $R_3$ and $R_5$ each independently represent a carboxyl group or a salt thereof, a sulfonic group or a salt thereof, a phosphate group or a salt thereof, or an alkyl group in which any one of these groups is substituted, $R_4$ and $R_6$ each independently represent a group except those defined for $R_3$ and $R_5$, p and r each independently represent an integer of 1 to 5, q and s each independently represent an integer of 0 to 4, and $p+q \leq 5$ and $r+s \leq 5$.)

The absorption spectrum of the copper phthalocyanine dye represented by the general formula (1) in the ink jet recording ink according to the present invention described above preferably satisfies the following conditions (1) and (2). The absorption spectrum is measured in accordance with JIS K 0115 "Absorptiometry general rules". (1) The absorption spectrum has peaks in both the wavelength range of 600 nm to 640 nm and the wavelength range of 650 nm to 680 nm. (2) The ratio between peak values of the absorption spectrum satisfies the following relationship.

$$B/A < 0.75$$

(In the expression, 'A' represents a peak value of the absorption spectrum in the wavelength range of 600 nm to 640 nm, and 'B' represents a peak value of the absorption spectrum in the wavelength range of 650 nm to 680 nm.)

In preferred aspects of the ink jet recording ink of the present invention, the content of the compound represented by the general formula (2) is 0.1 mass % or more and 3.0 mass % or less with respect to the total mass of the ink jet recording ink; the content of the compound represented by the general formula (1) is 0.5 mass % or more and 5.0 mass % or less with respect to the total mass of the ink jet recording ink; the mass ratio of the content of the compound represented by the general formula (1) to the content of the compound represented by the general formula (2) is 15/1 or more and 50/1 or less; the pH of the ink is in the range of 4 to 7.5; the ink jet recording ink further contains 0.1 mass % to 1.5 mass % of an ethylene oxide adduct of acetylene glycol represented by the following general formula (3) with respect to the total mass of the ink jet recording ink; and m and n in the compound represented by the following general formula (3) satisfy the relationship of 6<m+n<14.

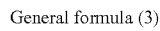

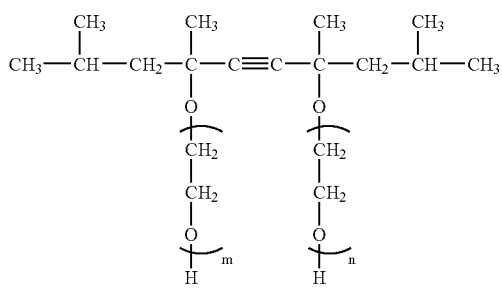

(In the general formula (3), m and n each independently represent an integer.)

The inventors have made extensive studies in view of the above objects to find that an ink composition using a specific solvent at a specific ratio with respect to the colorant represented by the general formula (2) satisfies the basic performance of the ink jet recording ink (specifically, the ink causes no clogging at the tip of a nozzle, the ink is excellent in start-up ejection stability, and the ink has such a viscosity that a high-resolution image is obtained). Thus, they have completed the invention to achieve the second object.

The invention to achieve the second object provides an ink jet recording ink described below as means for solving the above-mentioned problems.

That is, according to another aspect of the present invention, there is provided an ink jet recording ink having any one of the above constitutions, further containing at least three kinds of solvents including glycerin as a first solvent, a diol represented by the following general formula (4) as a second solvent, and one selected from a urea derivative represented by the following general formula (5), ethylene glycol, and 2-pyrrolidone as a third solvent. The ink is characterized in that the total content of the three kinds of solvents is 18 mass % or more and 27 mass % or less with respect to the total mass of the ink jet recording ink; the total content of the first and second solvents is 12 mass % or more and 20 mass % or less; and the mass ratio of the content of the first solvent to the content of the second solvent is 1.0 or more and 2.0 or less.

General Formula (4)

(In the general formula (4), n represents an integer of 1 to 6.)

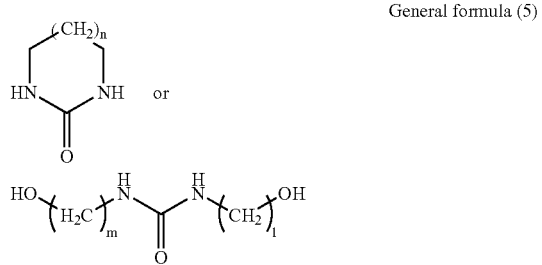

General formula (5)

(In the general formula (5), n represents an integer of 0 to 5, and m and l each independently represent an integer of 1 to 6.)

In further preferred aspects of the ink jet recording ink of the present invention having the above constitution, the second solvent is 1,5-pentanediol; the urea derivative represented by the general formula (5) is ethylene urea; the third solvent is ethylene urea; the content of the compound represented by the general formula (2) is 0.2 mass % or more and 3.0 mass % or less with respect to the total mass of the ink jet recording ink; and the pH of the ink jet recording ink is in the range of 5 to 7.5.

The inventors of the present invention have made extensive studies to find that the above problems can be solved by using an ink jet recording ink containing at least two kinds of colorants including a first colorant and a second colorant, the ink being characterized in that the second colorant has an ability to prevent a bronzing of the first colorant.

The term "bronzing" as used herein refers to "a phenomenon in which the crystal of a dye is separated out on paper as a recorded image dries, and the recorded image reflects light to glow in a yellow or brown color, thereby emitting metallic luster". Such phthalocyanine dye as represented by the general formula (1) is apt to cause the bronzing, and such compound as represented by the general formula (2) has an ability to prevent the bronzing.

According to another aspect of the present invention, there is provided an ink jet recording method, characterized by including applying the above ink jet recording ink to a recording medium by means of an ink jet head to form an image.

According to another aspect of the present invention, there is provided an ink cartridge, characterized by including the above ink jet recording ink.

According to another aspect of the present invention, there is provided an ink jet recording apparatus, characterized by including the above ink jet recording ink mounted thereon.

According to the present invention capable of achieving the first object, there can be provided an ink jet recording ink which is capable of suppressing the occurrence of a bronzing, which is capable of forming an image excellent in weatherability such as gas resistance, and which does not corrode or deteriorate a member to be in contact with the ink such as a recording head or a nozzle.

According to the present invention capable of achieving the second object, there can be provided an ink jet recording ink which achieves the first object, which does not cause clogging in a nozzle or opening of an ink jet recording apparatus and does not cause inconvenience such as failure in discharge of an ink droplet from a recording head when the ink is used for an ink jet recording method, which provides good start-up ejection stability and good stick recoverability comparable to those of the conventional ink jet ink containing urea or a derivative thereof, which does not cause a change in color tint or aggregation due to decomposition of a dye, which is excellent in long-term storage stability and discharge stability, and which has such an appropriate viscosity that a printed product having high resolution and high image quality can be created.

Furthermore, according to the present invention, there can be provided an ink jet recording method, an ink cartridge, and an ink jet recording apparatus each of which uses the above ink jet recording ink to provide the above effects.

DESCRIPTION OF THE PREFERRED EMBODIMENTS

Figure 1:
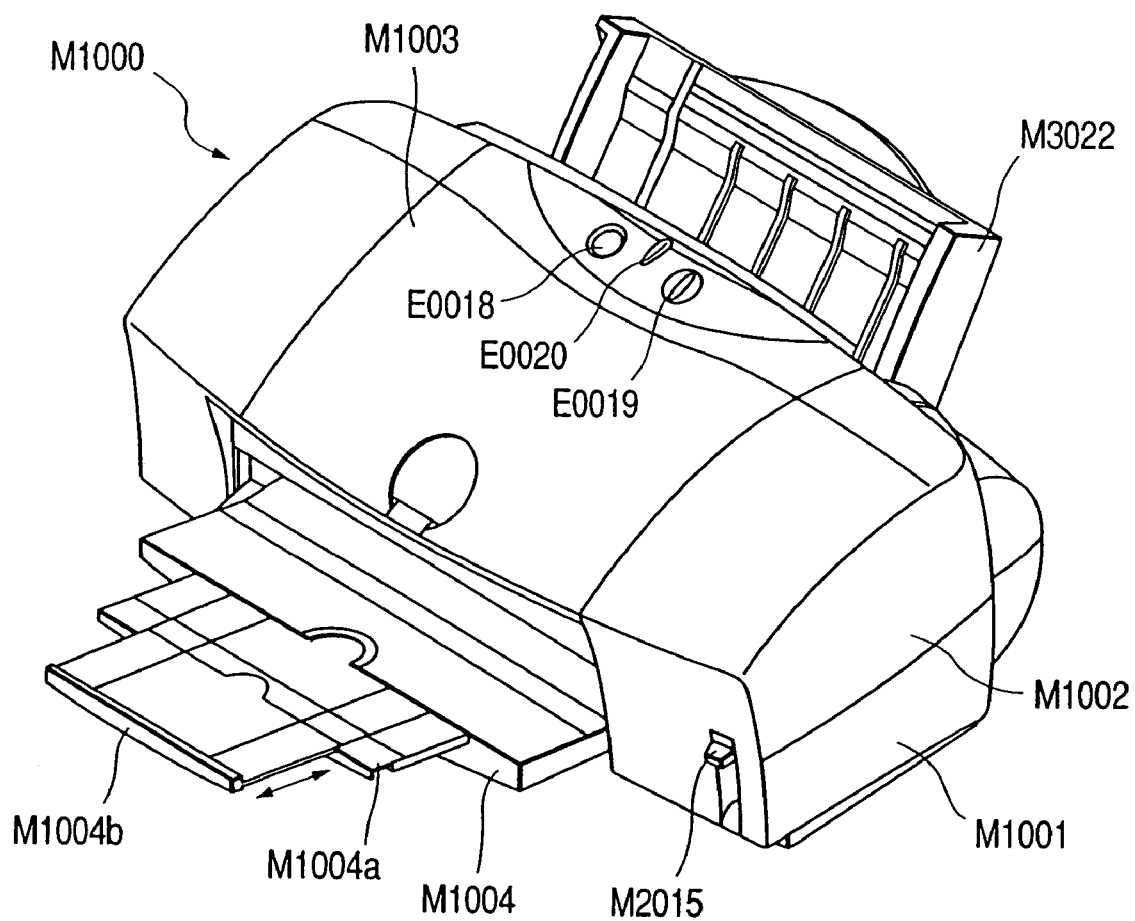
FIG. 1 is a perspective view showing an external configuration of an ink jet printer.

Hereinafter, the present invention will be described in more detail by way of the best mode for carrying out the invention.

(Ink Jet Recording Ink)

The ink according to the present invention essentially contains a copper phthalocyanine dye represented by the following general formula (1) and a compound represented by the following general formula (2). Any one of dyes or pigments generally used other than those described above and newly synthesized dyes or pigments may be used in combination as long as the addition of the dye or pigment provides an effect and the objects and effects of the present invention are not impaired. The total content of colorants in the ink jet recording ink is preferably 0.1 mass % to 15.0 mass % with respect to the total mass of the ink.

General formula (1)

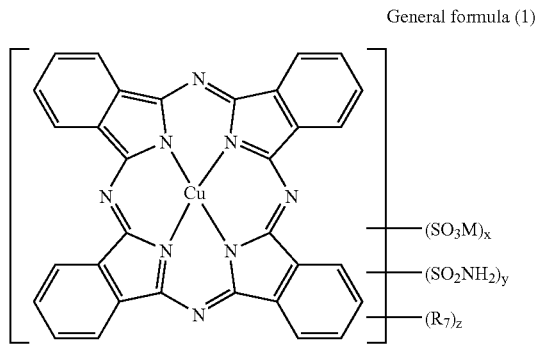

(In the general formula (1), M represents an alkali metal (such as Li, Na, K, Rb, Cs, or Fr) or ammonium, $R_7$ represents OH, COOM, or $R_8$COOM (where $R_8$ represents an alkyl group having 4 to 9 carbon atoms, and M represents an alkali metal or ammonium), and x, y, and z each independently represent an integer of 0 to 4.)

General formula (2)

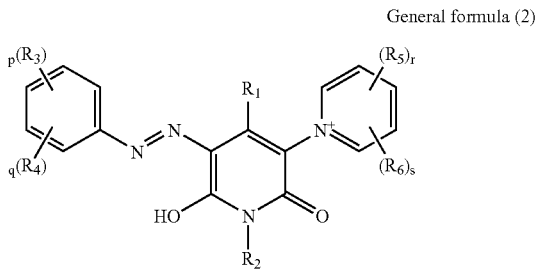

(In the general formula (2), $R_1$ and $R_2$ each independently represent a substituted or unsubstituted alkyl group, aryl group, or arylalkyl group, or a hydrogen atom, $R_3$ and $R_5$ each independently represent a carboxyl group or a salt thereof, a sulfonic group or a salt thereof, a phosphate group or a salt thereof, or an alkyl group in which any one of these groups is substituted, $R_4$ and $R_6$ each independently represent a group except those defined for $R_3$ and $R_5$, p and r each independently represent an integer of 1 to 5, q and s each independently represent an integer of 0 to 4, and $p+q \leq 5$ and $r+s \leq 5$.)

The absorption spectrum of the copper phthalocyanine dye represented by the general formula (1) used for the ink according to the present invention preferably satisfies the following conditions (1) and (2) for the reasons to be described later.

(1) The absorption spectrum has peaks in both the wavelength range of 600 nm to 640 nm and the wavelength range of 650 nm to 680 nm.

(2) The ratio between peak values of the absorption spectrum satisfies the following relationship.

$$B/A < 0.75$$

(In the expression, 'A' represents a peak value of the absorption spectrum in the wavelength range of 600 nm to 640 nm, and 'B' represents a peak value of the absorption spectrum in the wavelength range of 650 nm to 680 nm.)

In the present invention, in order to allow the ink to provide a desired color tone, a peak value of the absorption spectrum is preferably present in the wavelength range of 600 nm to 640 nm. However, when a peak of the absorption spectrum of the copper phthalocyanine dye is present only in the wavelength range of 600 nm to 640 nm, the bronzing is highly likely to occur. In other words, a suppressive effect on the bronzing may be insufficient. Even if the absorption spectrum has peaks in both the wavelength range of 600 nm to 640 nm and the wavelength range of 650 nm to 680 nm, the ink tends to be poor in fastness when the peak values do not satisfy the relationship of B/A<0.75.

The content of the compound represented by the general formula (2) in the ink jet recording ink according to the present invention is preferably 0.1 mass % or more and 3.0 mass % or less with respect to the total mass of the ink. The reason for this is as follows. When the content is lower than 0.1 mass %, a sufficient suppressive effect on the bronzing may not be obtained. On the other hand, when the content exceeds 3.0 mass %, an additional suppressive effect on the bronzing is hardly obtained.

The content of the compound represented by the general formula (1) is preferably 0.5 mass % or more and 5.0 mass % or less with respect to the total mass of the ink jet recording ink. The reason for this is as follows. When the content is lower than 0.5 mass %, color developability or the like may not be sufficiently exerted. When the content exceeds 5.0 mass %, a suppressive effect on the bronzing may be insufficient.

The mass ratio of the content of the compound represented by the general formula (1) (hereinafter, a colorant A) in the ink to the content of the compound represented by the general formula (2) (hereinafter, a colorant B) in the ink (colorant A/colorant B) is preferably 15/1 or more and 50/1 or less. That is, when the content of the compound (B) represented by the general formula (2) is excessively small, a bronzing may be apt to occur particularly in the case of printing on paper at high density. On the other hand, when the content of the compound (B) represented by the general formula (2) is excessively large, the color tint of the ink may be close to green. Although such ink has no problem when used as a green ink, the ink is not preferably used as a, cyan ink because the color tint may suffer from inconvenience.

In order that a good effect may be obtained when the ink jet recording ink according to the present invention is used for an ink jet recording apparatus having fine nozzles having a nozzle diameter of less than 20 μm and a liquid droplet volume of less than 4.5 pl, the content of the compound represented by the general formula (2) is preferably 0.2 mass % or more and 3.0 mass % or less with respect to the total mass of the ink. That is, according to such configuration, there can be provided an ink which does not cause clogging in nozzles or openings of the ink jet recording apparatus having the above configuration and does not cause inconvenience such as failure in discharge of an ink droplet from a recording head, which provides good start-up ejection stability comparable to that of the conventional ink for ink jet containing urea or a derivative thereof, and which has such an appropriate viscosity that a printed product having high resolution and high image quality can be created.

(Colorant)

Essential colorants in the present invention are a copper phthalocyanine dye represented by the following general formula (1) and a compound represented by the following general formula (2).

<A copper-phthalocyanine dye represented by the general formula (1)>

General formula (1)

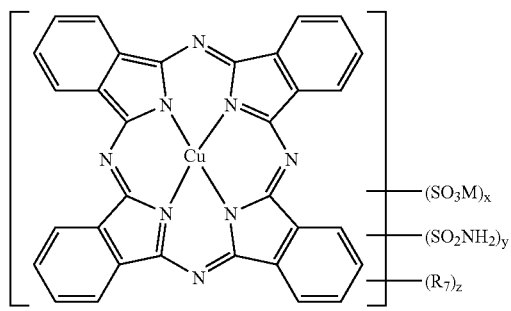

(In the general formula (1), M represents an alkali metal (such as Li, Na, K, Rb, Cs, or Fr) or ammonium, $R_7$ represents OH, COOM, or $R_8$COOM (where $R_8$ represents an alkyl group having 4 to 9 carbon atoms, and M represents an alkali metal or ammonium), and x, y, and z each independently represent an integer of 0 to 4.)

A single colorant selected from the group of the colorants represented by the general formula (1) may be used alone, or two or more colorants selected from the group may be used as a mixture. Specific examples of the colorant represented by the general formula (1) include C.I. Direct Blue 86, 87, and 199.

<Compound represented by the general formula (2)>

In the present invention, a compound represented by the following general formula (2) is incorporated into the ink in addition to the copper phthalocyanine dye represented by the general formula (1). The addition of even a small amount of the compound represented by the general formula (2) can suppress the bronzing of the copper phthalocyanine dye represented by the general formula (1) without increasing the pH of the ink and without impairing other basic performance.

General formula (2)

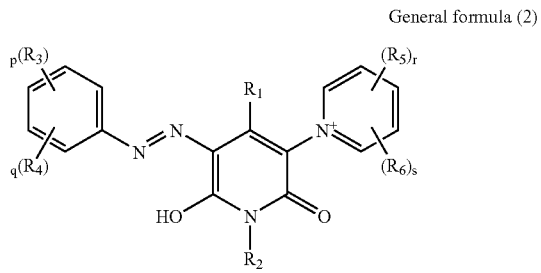

(In the general formula (2), $R_1$ and $R_2$ each independently represent a substituted or unsubstituted alkyl group, aryl group, or arylalkyl group, or a hydrogen atom, $R_3$ and $R_5$ each independently represent a carboxyl group or a salt thereof, a sulfonic group or a salt thereof, a phosphate group or a salt thereof, or an alkyl group in which any one of these groups is substituted, $R_4$ and $R_6$ each independently represent a group except those defined for $R_3$ and $R_5$, p and r each independently represent an integer of 1 to 5, q and s each independently represent an integer of 0 to 4, and $p+q \leqq 5$ and $r+s \leqq 5$.)

The reason why the combined use of the compound represented by the general formula (2) can suppress a bronzing that occurs when the copper phthalocyanine dye represented by the general formula (1) is used is probably as follows, although the reason has not been confirmed yet. The compound represented by the general formula (1) causes regular stacking (association) on paper (the surface of a recording medium). The compound represented by the general formula (2) successfully enters the stacking (association) structure formed by the compound represented by the general formula (1), whereby the occurrence of a bronzing can be suppressed. Even a small usage of the compound represented by the general formula (2) is effective probably by virtue of the structure of the compound represented by the general formula (2).

Specific examples of the compound represented by the general formula (2) will-be shown below. Any one of them may be used in the present invention, and Exemplified Compound 1 is most preferably used.

Exemplified Compound 1

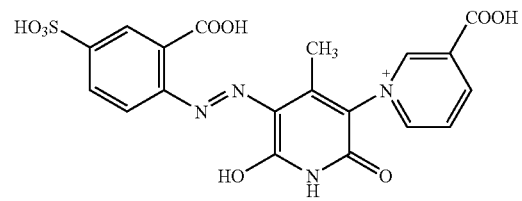

Exemplified Compound 2

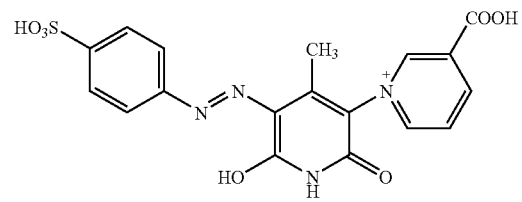

Exemplified Compound 3

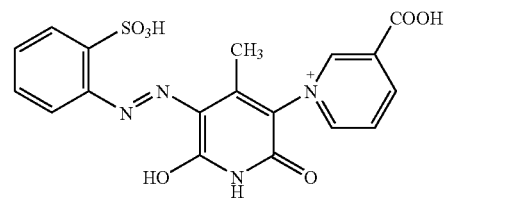

Exemplified Compound 4

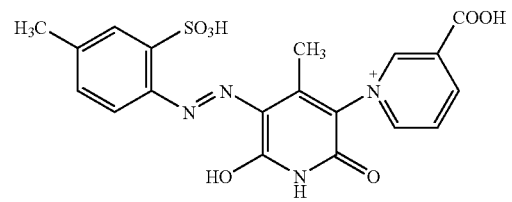

Exemplified Compound 5

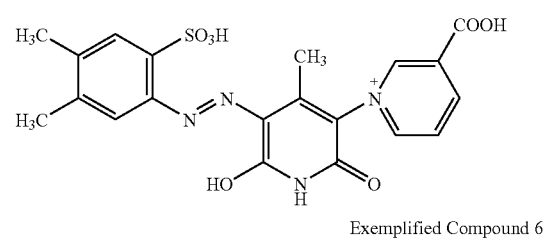

Exemplified Compound 6

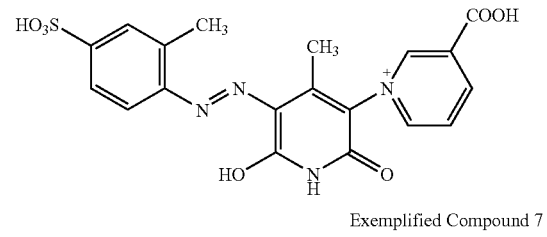

Exemplified Compound 7

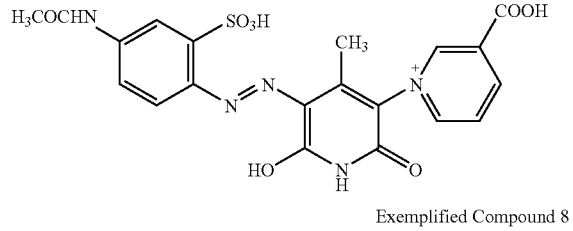

Exemplified Compound 8

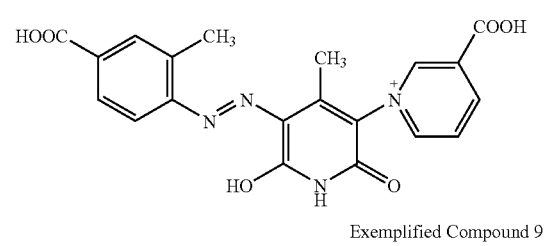

Exemplified Compound 9

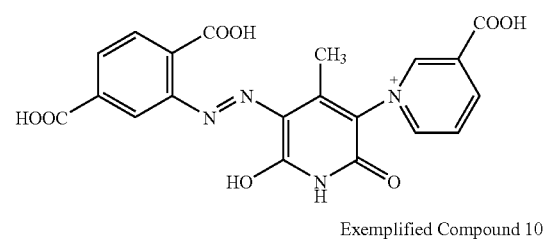

Exemplified Compound 10

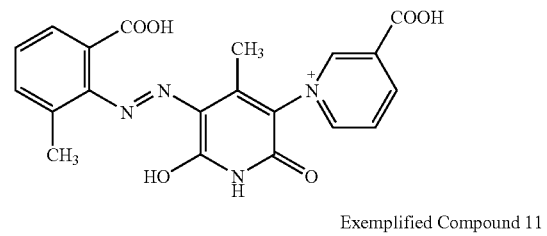

Exemplified Compound 11

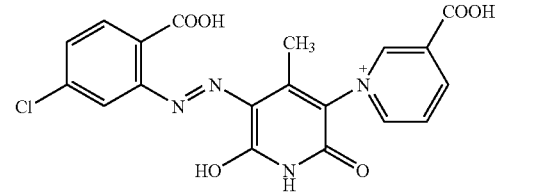

Exemplified Compound 12

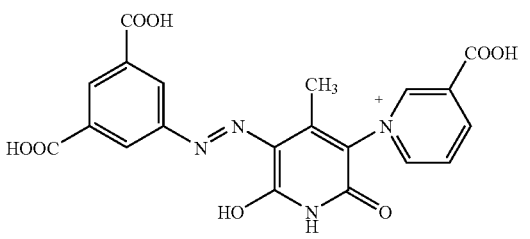

Exemplified Compound 13

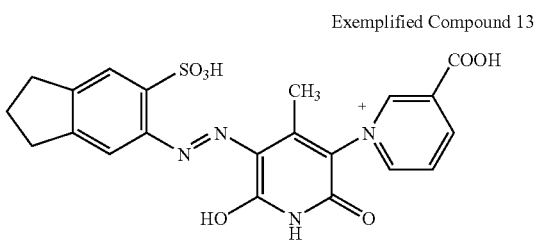

(Aqueous Medium)

The ink of the present invention is prepared by dissolving or dispersing the above colorants into an aqueous medium mainly composed of water. The aqueous medium may be a mixed medium containing water and a water-soluble organic solvent. Any water-soluble organic solvent generally used as a solvent for ink jet inks can be used without any problem, and examples thereof include alcohol, polyhydric alcohol, polyglycol, glycol ether, a nitrogen-containing polar solvent, a sulfur-containing polar solvent, urea or a derivative thereof, and saccharides. Each of those solvents is appropriately used for, for example, maintaining the moisture retention of the ink, improving the solubility and dispersibility of the colorants, and assisting the ink to penetrate into recording paper. Each of those solvents may be used alone, or two or more of them may be used in combination. Water or deionized water (ion-exchanged water) is preferably used for the water in the aqueous medium.

The content of the water-soluble organic solvent is in the range of preferably 1 mass % to 50 mass %, or more preferably 3 mass % to 40 mass % with respect to the total mass of the ink jet recording ink. In addition, the water content in the ink is preferably in the range of 30 mass % to 95 mass % with respect to the total mass of the ink jet recording ink for maintaining the solubility of the dye and the discharge stability of the ink at good levels.

In the present invention, a surfactant may also be incorporated in the ink for reducing the surface tension of the ink to obtain improved ink jet suitability. The surfactant to be used at this time is preferably an ethylene oxide adduct of acetylene glycol represented by the following general formula (3). It is particularly preferable that the ink contain 0.1 mass % to 1.5 mass % of the surfactant.

General formula 3

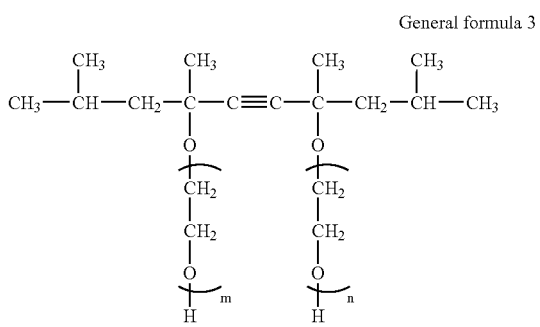

(In the general formula (3), m and n each independently represent an integer.)

The ink of the present invention preferably has the following constitution in addition to the above constitution. That is, it is preferable to use an aqueous medium containing at least three kinds of solvents including glycerin as a first solvent, a diol represented by the following general formula (4) as a second solvent, and one selected from a urea derivative represented by the following general formula (5), ethylene glycol, and 2-pyrrolidone as a third solvent.

The total content of the at least three kinds of solvents including the first, second, and third solvents is preferably 18 mass % or more and 27 mass % or less with respect to the total mass of the ink jet recording ink. When the total content is less than 18 mass %, stick recoverability may deteriorate. When the total content exceeds 27 mass %, the viscosity of the ink increases, so the supply rate of the ink to nozzles or openings may remarkably reduce.

The ratio of the total content of the first and second solvents to the ink also plays an important role in the present invention. That is, the total content of the first and second solvents is preferably 12 mass % or more and 20 mass % or less with respect to the total mass of the ink jet recording ink. When the total content is less than 12 mass %, stick recoverability and start-up ejection stability may deteriorate. When the total content exceeds 20 mass %, the viscosity of the ink increases, so the supply rate of the ink to a nozzle or opening may remarkably reduce.

In addition to the foregoing, the mass ratio of the content of the first solvent to the content of the second solvent in the ink is preferably 1.0 or more and 2.0 or less. When the mass ratio between the contents is less than 1.0, start-up ejection stability may deteriorate. When the mass ratio exceeds 2.0, stick recoverability may deteriorate.

An image in which the occurrence of a bronzing is suppressed can be obtained when an ink satisfying all the conditions described above including colorants, a solvent composition, and the like is used for image formation. In addition, such ink sufficiently achieves all properties including stick recoverability, start-up ejection stability, and high-speed printing discharge stability.

(Other Components and Physical Properties of Ink)

A surfactant may be added to the ink according to the present invention. Specific examples of the surfactant include anionic surfactants such as fatty salts, higher alcohol sulfates, liquid fatty oil sulfates, and alkylallyl sulfonates; and nonionic surfactants such as polyoxyethylene alkyl ethers, polyoxyethylene alkyl esters, polyoxyethylene sorbitan alkyl esters, acetylene alcohol, and acetylene glycol. One or two or more of them may be appropriately selected and used. At this time, the addition amount of a surfactant is preferably determined in such a manner that the ink has a surface tension of 10 mN/m (dyn/cm) or more (preferably 20 mN/m or more) and 60 mN/m or less at 25° C. The addition of a surfactant to the ink can prevent the occurrence of, for example, shifted printing (displacement of an impact point of an ink droplet) due to a wet tip of a nozzle.

In addition to the above components, any one of various additives may be added to the ink according to the present invention as long as the addition of the additive provides an effect and the objects and effects of the present invention are not impaired. Examples of the additives include a pH adjustor, a rust inhibitor, an antiseptic, an antifungus agent, an antioxidant, a reduction inhibitor, an evaporation accelerator, a chelating agent, and a water-soluble polymer.

In addition, the ink according to the present invention is adjusted so as to have a desired viscosity and a desired pH so that good discharge property can be obtained when the ink is used while being mounted on an ink jet recording apparatus. In particular, the pH of the ink is preferably adjusted as described below. The pH of the ink is preferably adjusted to 4 or more in order to obtain a sufficient suppressive effect on the occurrence of a bronzing at the time of image formation. In addition, the pH of the ink is preferably adjusted to 7.5 or less in order to provide the ink with, for example, long-term storage stability. In order to enable the ink to provide start-up ejection stability, prevent clogging at the tip of a nozzle, and provide a high-resolution and high-image-quality printed product, the pH of the ink is preferably 5 or more, and the pH is preferably 7.5 or less in order to provide the ink with, for example, long-term storage stability.

(Recording Medium)

Examples of a recording medium used in combination with the ink according to the present invention for forming an image include such recording media as may be generally used including plain paper as well as special media having a coating layer or an ink receiving layer on its surface such as glossy paper, coated paper, and glossy film. Of those, a special medium having a hydrophilic porous particle layer, porous polymer layer, or the like on a base material can be exemplified as a recording medium capable of providing an image with improved visibility, contrast, and transparency.

An example of a special medium as a recording medium to be used in the present invention will be described in more detail. The special medium is a recording medium on which an image is formed by at least a colorant such as a dye or a pigment which is adsorbed by fine particles forming a hydrophilic porous structure in an ink receiving layer, and the recording medium is particularly suitable when an ink jet method is used. Such recording medium is preferably of an absorption type in which a void formed in an ink receiving layer on a support absorbs ink.

An ink receiving layer of an absorption type is constituted as a hydrophilic porous layer which is mainly composed of fine particles and contains a binder and any other additive as required. Examples of the fine particles include inorganic pigments such as silica, clay, talc, calcium carbonate, kaolin, aluminum oxide (such as alumina or alumina hydrate), diatomaceous earth, titanium oxide, hydrotalcite, and zinc oxide; and organic pigments such as a urea formalin resin, an ethylene resin, and a styrene resin. One or more of them can be used.

A water-soluble polymer or latex is preferably used as a binder. Examples of an available binder include polyvinyl alcohol or a modified product thereof; starch or a modified product thereof; gelatin or a modified product thereof; gum arabic; cellulose derivatives such as carboxymethyl cellulose, hydroxyethyl cellulose, and hydroxypropylmethyl cellulose; vinyl-based copolymer latexes such as an SBR latex, an NBR latex, a methyl methacrylate-butadiene copolymer latex, a functional group-modified polymer latex, and an ethylene-vinyl acetate copolymer; polyvinyl pyrrolidone; maleic anhydride or a copolymer thereof; and acrylate copolymers. Two or more of them may be used in combination as required. An additive may also be used. Examples of an additive to be used as required include a dispersant, a thickener, a pH adjustor, a lubricant, a fluidity denaturing agent, a surfactant, an antifoaming agent, a releasing agent, a fluorescent bleach, a UV absorber, and an antioxidant.

(Recording Method and Recording Apparatus)

A recording method and a recording apparatus which are suitable for recording an image on a recording medium by means of the ink according to the present invention are, for example, a method and an apparatus in which thermal energy corresponding to a recording signal is applied to ink in a chamber of a recording head to generate a liquid droplet.

Figure 2:
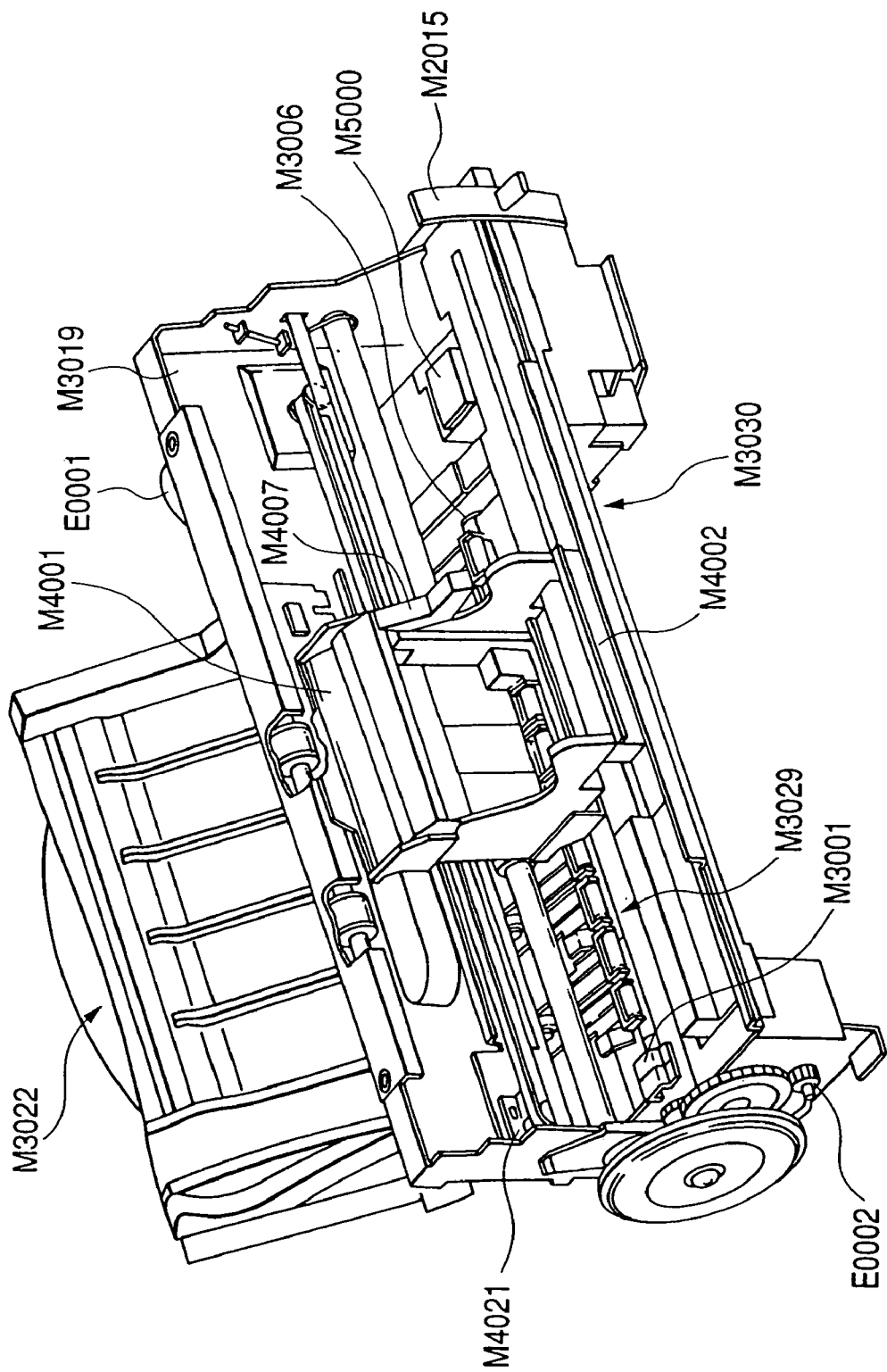
FIG. 2 is a perspective view showing a state where an external packaging member is removed from the printer shown in FIG. 1.

FIGS. 1 and 2 each schematically show an example of a configuration of a printer using an ink jet recording method. In FIG. 1, the contour of an apparatus main body M1000 of the printer in this embodiment is composed of an external packaging member including a lower case M1001, an upper case M1002, an access cover M1003, and a discharge tray M1004; and a chassis M3019 (see FIG. 2) stored in the external packaging member.

The chassis M3019 is composed of multiple plate-like metal members each having a predetermined rigidity, and serves as a skeleton of the recording apparatus to hold each of the recording operation mechanisms to be described later. In addition, the lower case M1001 forms a substantial lower half portion of the external packaging of the apparatus main body M1000, while the upper case M1002 forms a substantial upper half portion thereof. A combination of both the cases provides a hollow body structure having a storage space for storing the respective mechanisms to be described later in it. Openings are formed on the upper surface portion and front surface portion of the apparatus main body M1000.

Furthermore, one end of the discharge tray M1004 is rotatably held by the lower case M1001. The rotation of the tray may open and close the opening formed on the front surface portion of the lower case M1001. Therefore, when a recording operation is performed, the discharge tray M1004 is rotated toward the front surface side to open and close the opening, whereby a recording sheet can be discharged therefrom and discharged recording sheets P can be sequentially stacked. In addition, the discharge tray M1004 stores two auxiliary trays M1004a and M1004b. The respective trays are pulled frontward as required, whereby an area for supporting paper can be increased or reduced in three levels.

One end of the access cover M1003 is rotatably held by the upper case M1002 so as to be capable of opening and closing the opening formed on the upper surface. A recording head cartridge H1000, ink tanks H1900, and the like stored in the main body can be exchanged by opening the access cover M1003. Although not expressly shown here, when the access cover M1003 is opened or closed, a projection formed on the rear surface of the cover rotates a cover open/close lever. The rotational position of the lever is detected by means of a microswitch or the like, whereby the opened/closed state of the access cover can be detected.

In addition, the rear upper surface of the upper case M1002 is provided with a power source key E0018 and a resume key E0019 in such a manner that the keys can be depressed. The rear upper surface is also provided with an LED E0020. Depressing the power source key E0018 causes the LED E0020 to light up, thereby informing an operator of the fact that recording can be performed. The LED E0020 has various display functions. For example, the LED E0020 changes the manner of blinking or the color at the time of lighting, or informs the operator of, for example, a trouble in the printer. When a trouble or the like has been solved, the resume key E0019 is depressed, whereby recording is restarted.

(Recording Operation Mechanism)

A recording operation mechanism is composed of an automatic feeding portion M3022 for automatically feeding a recording sheet P to the inside of the apparatus main body; a conveying portion M3029 for leading the recording sheets P fed from the automatic feeding portion one by one to a predetermined recording position and for leading the recording sheet P from the recording position to a discharge portion M3030; a recording portion for performing a desired recording on the recording sheet P conveyed to the recording position; and a recovery portion (M5000) for subjecting the recording portion or the like to a recovery treatment.

(Recording Portion)

The recording portion is composed of a carriage M4001 movably supported by a carriage shaft M4021 and the recording head cartridge H1000 detachably mounted on the carriage M4001.

(Recording Head Cartridge)

The recording head cartridge to be used for the recording portion will be described with reference to FIGS. 3 to 10.

Figure 3A:
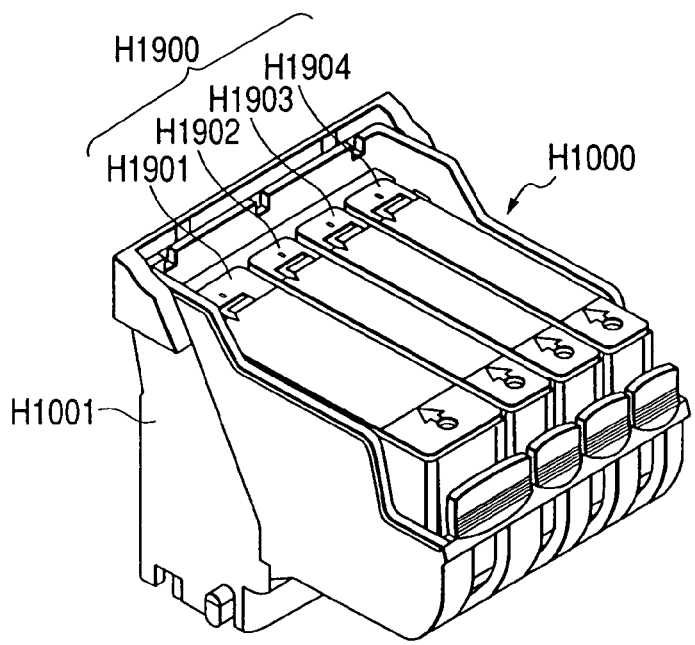
FIG. 3A is a perspective view of a recording head cartridge.
Figure 3B:
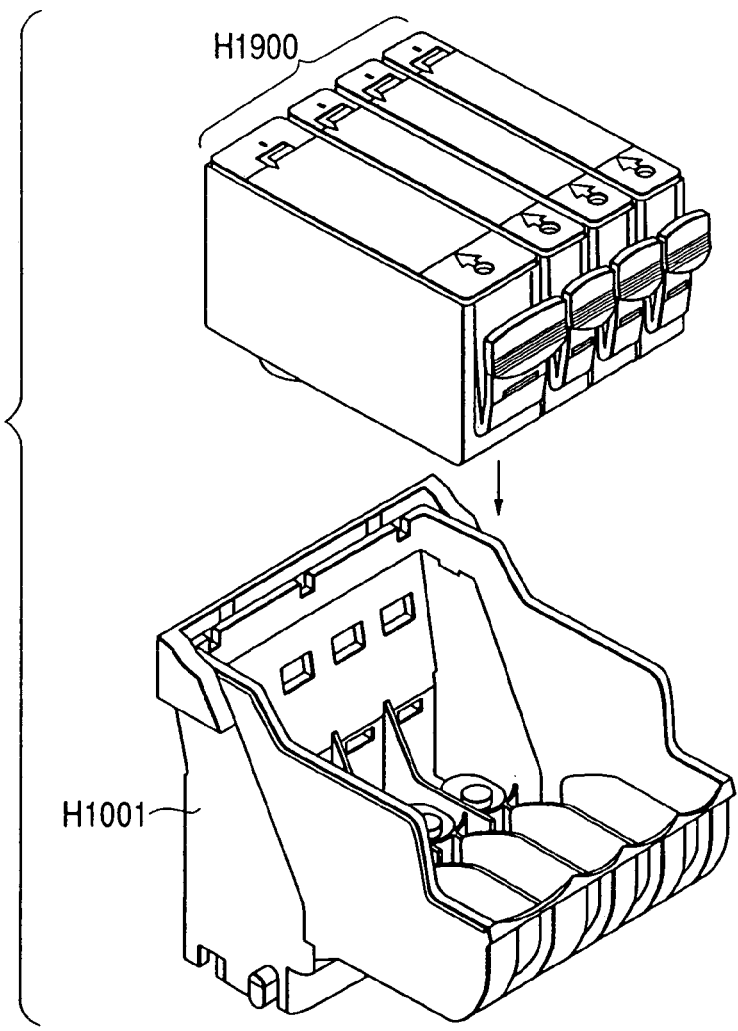
FIG. 3B is an exploded perspective view of the recording head cartridge.

As can be seen from the perspective views of FIGS. 3A and 3B, a recording head H1001 is one of the components composing the recording head cartridge H1000. The recording head cartridge H1000 is composed of the recording head H1001 and an ink tank H1900 (H1901, H1902, H1903, and H1904) detachably attached to the recording head H1001. The recording head cartridge H1000 is fixed and supported by a positioning means and electrical contact of the carriage M4001 mounted on the ink jet recording apparatus main body, and is detachable from the carriage M4001. An ink tank H1901 is used for a black ink, an ink tank H1902 is used for a cyan ink, an ink tank H1903 is used for a magenta ink, and an ink tank H1904 is used for a yellow ink. Each of the ink tanks H1901, H1902, H1903, and H1904 is detachable from the recording head H1001 and is exchangeable, whereby the running cost of printing in the ink jet recording apparatus is reduced.

Next, the respective components composing the recording head H1001 will be described in more detail in order. FIGS. 4 to 10 are explanatory views for explaining a suitable head cartridge, recording head, and ink tank in or to which the present invention is carried out or applicable, and a relation among them. Hereinafter, the respective components will be described with reference to those figures.

(1) Recording Head

The recording head H1001 is of a bubble jet side shooter type in which recording is performed by using an electro-thermal converter for generating thermal energy for causing ink to generate film boiling in accordance with an electrical signal.

Figure 4:
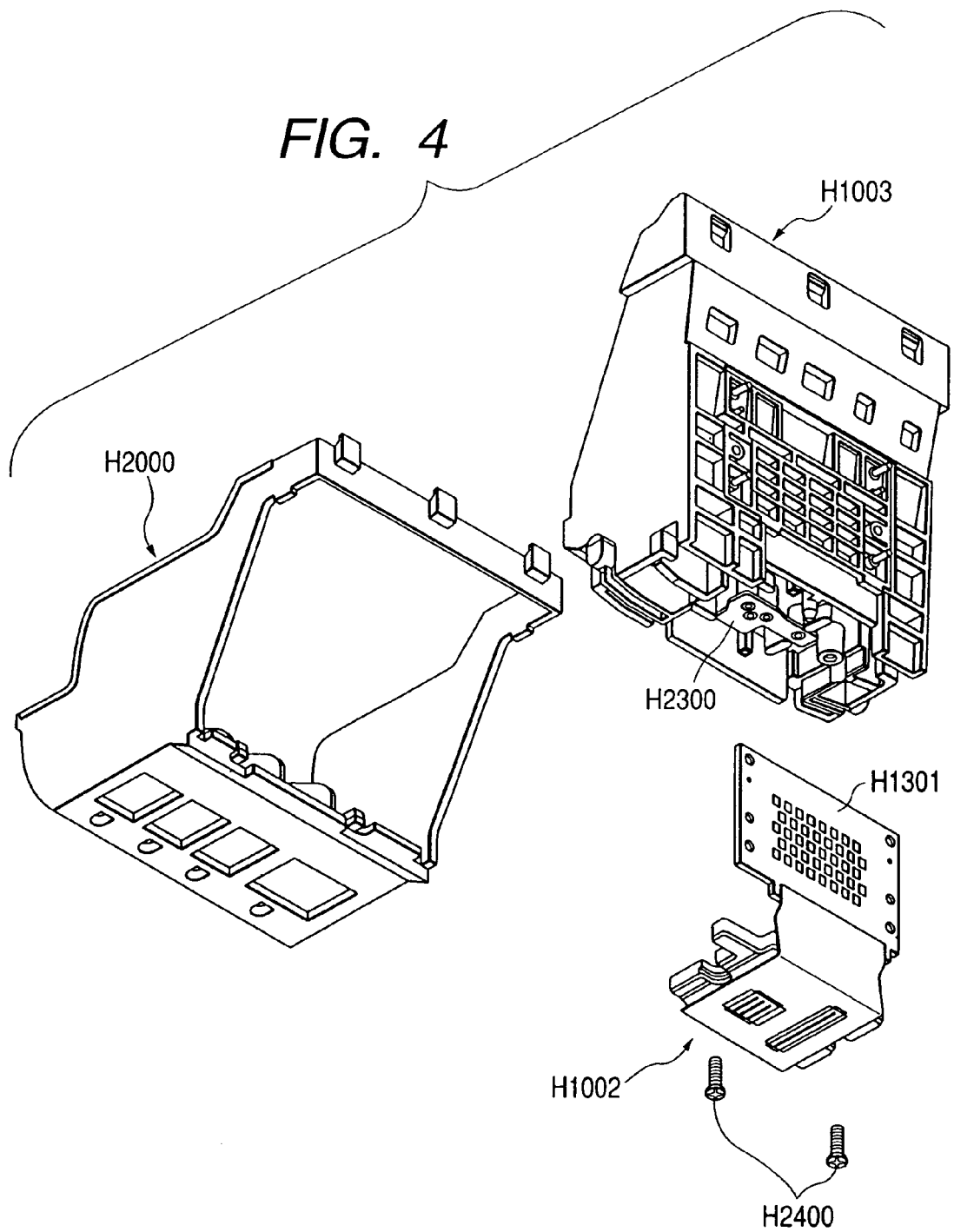
FIG. 4 is an exploded perspective view showing a configuration of the recording head shown in each of FIGS. 3A and 3B.

As shown in the perspective view of FIG. 4, the recording head H1001 is composed of a recording element unit H1002, an ink supply unit H1003, and a tank holder H2000.

Figure 5:
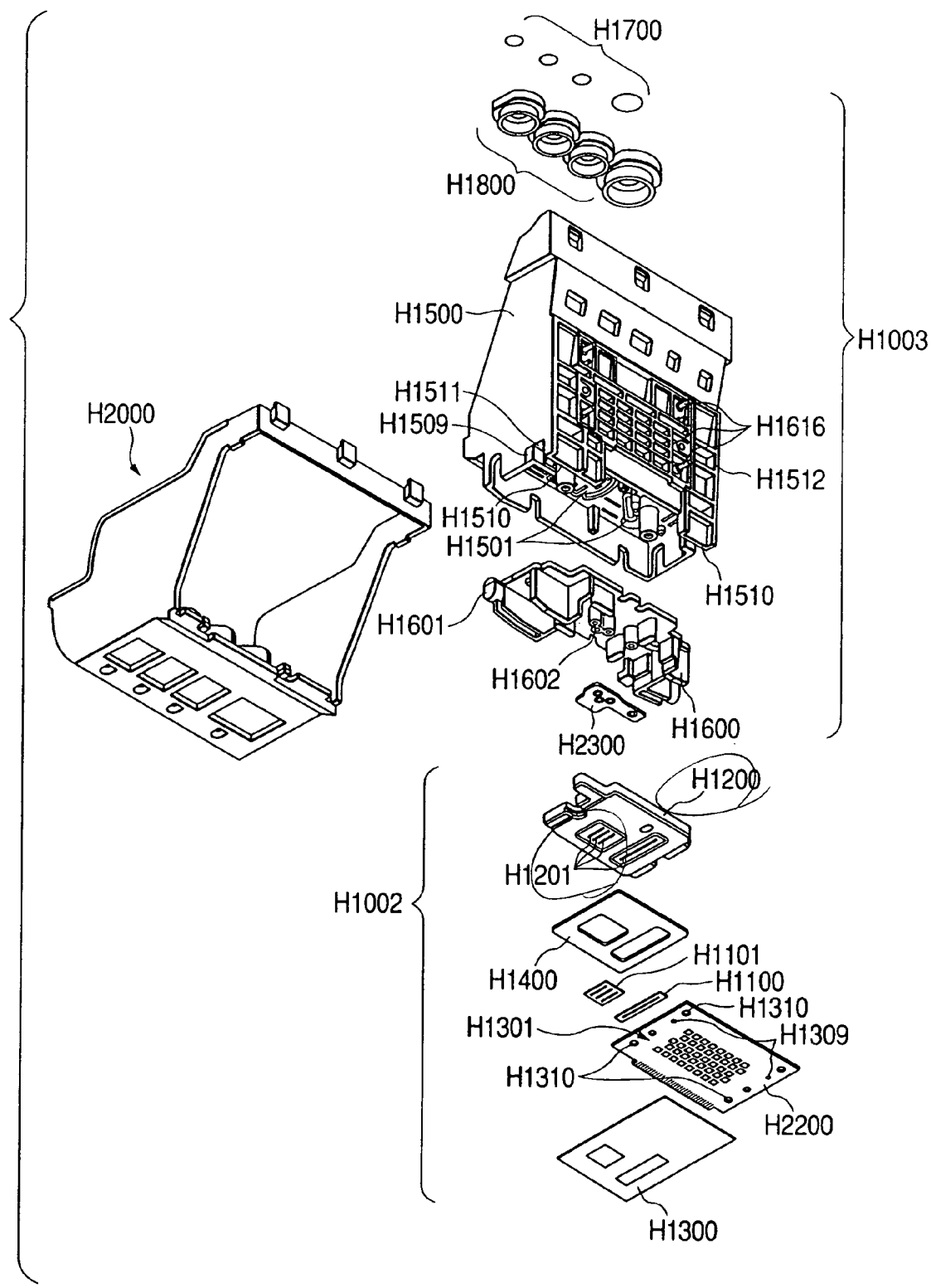
FIG. 5 is an exploded perspective view showing a state where the recording head shown in each of FIGS. 3A and 3B is exploded further finely.

Furthermore, as shown in the perspective view of FIG. 5, the recording element unit H1002 is composed of a first recording element substrate H1100, a second recording element substrate H1101, a first plate H1200, an electric wiring tape H1300, an electric contact substrate H2200, and a second plate H1400, and the ink supply unit H1003 is composed of an ink supply member H1500, a flow path forming member H1600, a joint rubber H2300, a filter H1700, and a seal rubber H1800.

(1-1) Recording Element Unit

Figure 6:
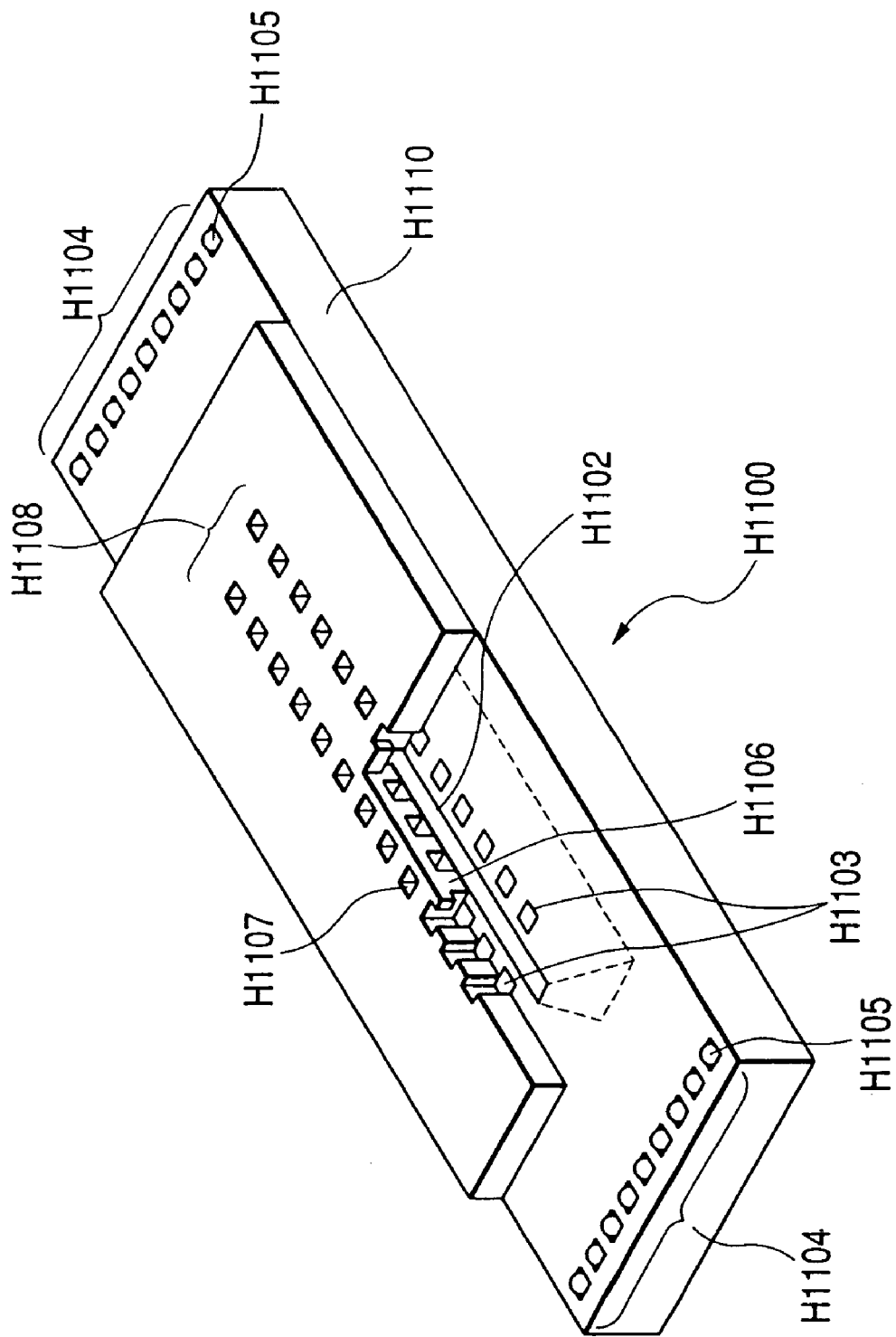
FIG. 6 is a partially cut explanatory perspective view showing a configuration of a recording element substrate of the recording head cartridge shown in each of FIGS. 3A and 3B.

FIG. 6 is a partially exploded perspective view for explaining the configuration of the first recording element substrate H1100. The first recording element substrate H1100 is formed as follows. An ink supply port H1102 composed of a long groove-like through hole is formed as an ink flow path in, for example, an Si substrate H1110 having a thickness of 0.5 to 1 mm by means of anisotropic etching utilizing the crystal orientation of Si, sand blasting, or the like. One train of electrothermal converting elements H1103 is arranged in a zigzag fashion on each of both sides with the ink supply port H1102 sandwiched between the sides. The electrothermal converting elements H1103 and an electric wiring made of Al or the like for supplying the electrothermal converting elements H1103 with power are formed by means of a film formation technique.

Furthermore, electrode portions H1104 for supplying the electric wiring with power are arranged on both the external sides of the electrothermal converting elements H1103. Bumps H1105 made of Au or the like are formed on the electrode portions H1104. An ink flow path wall H1106 for forming an ink flow path corresponding to the electrothermal converting elements H1103 and discharge ports H1107 are formed from a resin material on the Si substrate by means of a photolithography technique, so a group of discharge ports H1108 is formed. Since the discharge ports are arranged so as to be opposed to the electrothermal converting elements H1103, an ink supplied from the, ink flow path H1102 is discharged by air bubbles generated by the electrothermal converting elements H1103.

Figure 7:
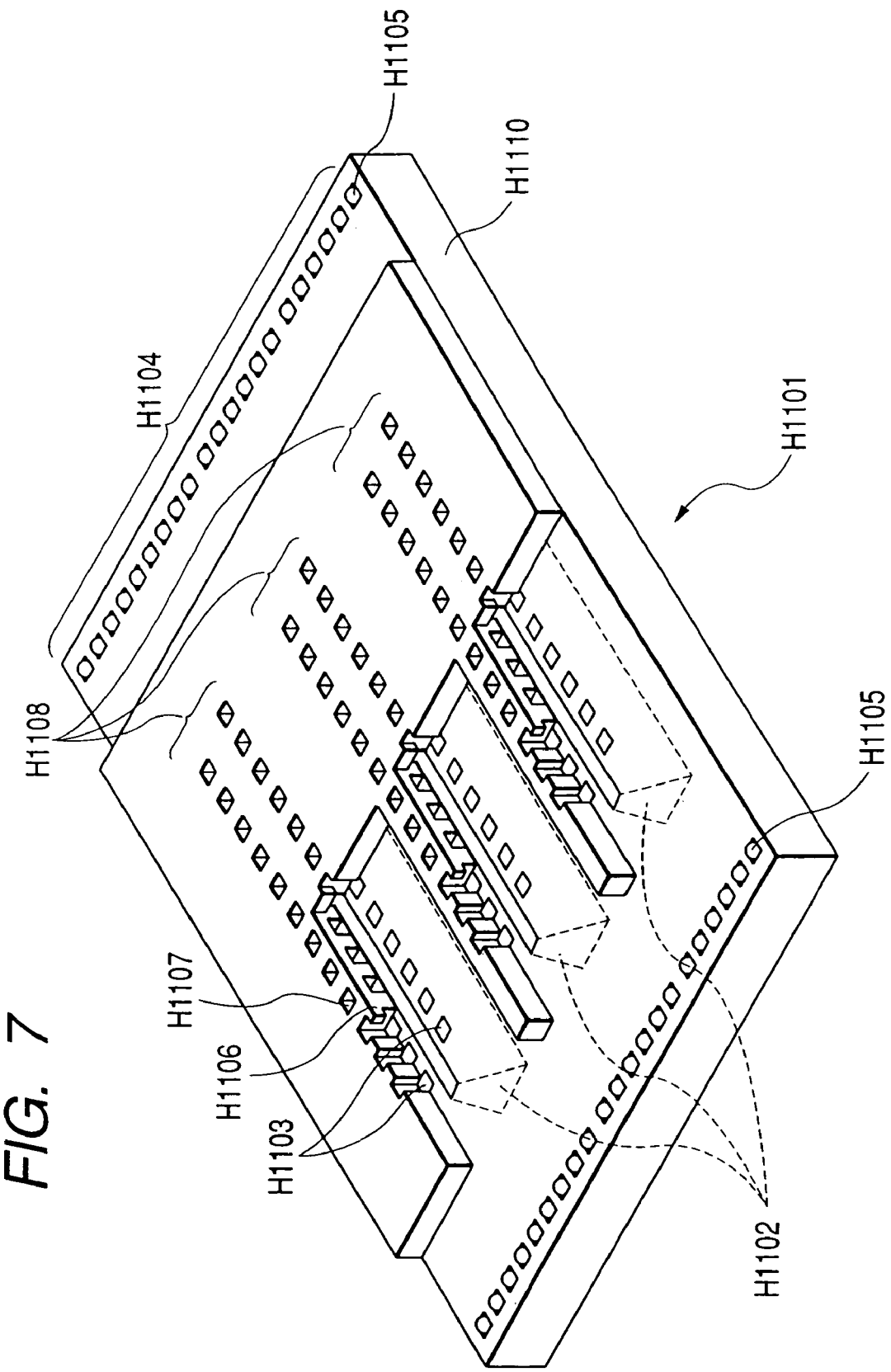
FIG. 7 is a partially cut explanatory perspective view showing a configuration of another recording element substrate of the recording head cartridge shown in each of FIGS. 3A and 3B.

FIG. 7 is a partially exploded perspective view for explaining the configuration of the second recording element substrate H1101. The second recording element substrate H1101 is a recording element substrate for discharging three color inks, and has three ink supply ports H1102 formed in parallel with one another. Electrothermal converting elements and ink discharge ports are formed on both sides of each ink supply port. Of course, as in the case of the first recording element substrate H1100, the ink supply ports, the electrothermal converting elements, electric wiring, electrode portions, and the like are formed in an Si substrate, and an ink flow path and ink discharge ports are formed from a resin material on them by means of a photolithography technique.

Furthermore, as in the case of the first recording element substrate, the bumps H1105 made of Au or the like are formed on the electrode portions H1104 for supplying the electric wiring with power.

Next, the first plate H1200 is formed of, for example, an alumina ($Al_2O_3$) material having a thickness of 0.5 to 10 mm. The material for the first plate is not limited to alumina, and the first plate may be formed of a material having a coefficient of linear expansion comparable to that of the material for the recording element substrate H1100 and having a thermal conductivity equal to or larger than that of the material for the recording element substrate H1100. For example, any one of silicon (Si), aluminum nitride (AlN), zirconia, silicon nitride ($Si_3N_4$), silicon carbide (SiC), molybdenum (Mo), and tungsten (W) may be used as the material for the first plate H1200. The first plate H1200 has an ink supply port H1201 for supplying the first recording element substrate H1100 with a black ink and another ink supply port H1201 for supplying the second recording element substrate H1101 with a cyan, magenta, and yellow inks. The respective ink supply ports H1102 of the recording element substrates correspond to the ink supply ports H1201 of the first plate H1200. In addition, each of the first recording element substrate H1100 and the second recording element substrate H1101 is bonded and fixed to the first plate H1200 with high accuracy. A first adhesive H1202 used for the bonding is desirably one which has a low viscosity and a low curing temperature, which cures for a short period of time, which has a relatively high hardness after curing, and which has ink resistance. The first adhesive H1202 is, for example, a heat curing adhesive mainly composed of an epoxy resin, and the thickness of an adhesive layer is desirably 50 µm or less.

The electric wiring tape H1300 applies electrical signals for discharging ink to the first and second recording element substrates H1100 and H1101. The electric wiring tape H1300 includes multiple openings into which the respective recording element substrates are to be incorporated; electrode terminals H1302 (not shown) corresponding to the electrode portions H1104 of the respective recording element substrates; and electrode terminal portions H1303 (not shown) placed at the ends of the wiring tape so as to be electrically connected with the electric contact substrate H2200 having external signal input terminals H1301 for receiving electrical signals from the apparatus main body. The electrode terminals H1302 and the electrode terminal H1303 are connected through a continuous copper foil wiring pattern.

The electric wiring tape H1300, the first recording element substrate H1100, and the second recording element substrate H1101 are electrically connected to one another. They are connected by, for example, electrically joining the electrode portions H1104 of the recording element substrates and the electrode terminals H1302 of the electric wiring tape H1300 according to the heat-ultrasonic wave contact bonding.

The second plate H1400 is, for example, a single plate-like member having a thickness of 0.5 mm to 1 mm, and is formed of, for example, ceramics such as alumina ($Al_2O_3$) or a metal material such as Al or SUS. The second plate H1400 has openings larger than the outside dimensions of the first and second recording element substrates H1100 and H1101 bonded and fixed to the first plate H1200. In addition, the second plate H1400 is bonded to the first plate H1200 with a second adhesive H1203 in such a manner that the first and second recording element substrates H1100 and H1101, and the electric wiring tape H1300 can be electrically connected in a planar fashion. The rear surface of the electric tape H1300 is bonded and fixed to the second plate with a third adhesive H1306.

Electric connection portions among the first and second recording element substrates H1100 and H1101, and the electric wiring tape H1300 are sealed with a first sealing compound H1307 (not shown) and a second sealing compound H1308, so the electric connection portions are protected from corrosion due to ink and from external impact. The first sealing compound mainly seals the rear side of the connection portions of the electrode terminals H1302 of the electric wiring tape and the electrode portions H1105 of the recording element substrates, and the outer peripheral portions of the recording element substrates, and the second sealing compound seals the front side of the connection portions.

Furthermore, the electric contact substrate H2200 having the external signal input terminals H1301 for receiving electrical signals from the apparatus main body is thermally compression-bonded by means of an anisotropic conductive film or the like to the ends of the electric wiring tape for electrical connection.

Then, the electric wiring tape H1300 is bent at one side of the first plate H1200, and is bonded to the side of the first plate H1200 with the third adhesive H1306 (not shown). The third adhesive H1306 is, for example, a heat curing adhesive mainly composed of an epoxy resin and having a thickness of 10 to 100 μm.

(1-2) Ink Supply Unit

The ink supply member H1500 is formed by, for example, molding a resin material. The resin material is desirably a resin material mixed with 5 to 40% of a glass filler for improving shape rigidity.

Figure 8:
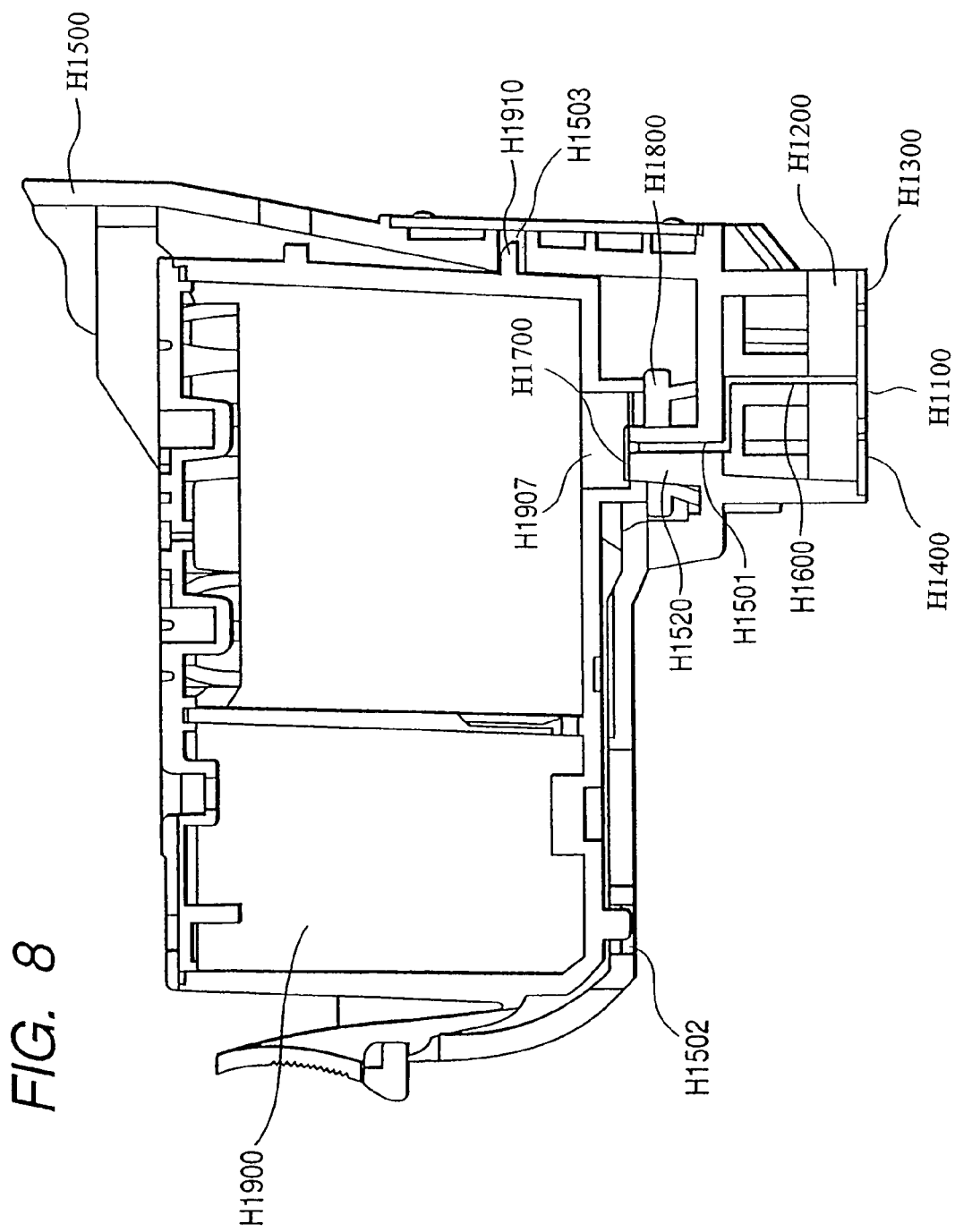
FIG. 8 is a sectional view of a main portion of the recording head cartridge shown in each of FIGS. 3A and 3B.

As shown in FIGS. 5 and 8, the ink supply member H1500 is one of the components of the ink supply unit H1003 for leading an ink from the ink tank H1900 to the recording element unit H1002, and subjects the flow path forming member H1600 to ultrasonic welding to form an ink flow path H1501. In addition, a filter H1700 for preventing dust from entering from the outside is joined through welding with a joint H1517 to be engaged with the ink tank H1900. Furthermore, the seal rubber H1800 is mounted for preventing ink from evaporating from the joint H1517.

The ink supply member H1500 also partially has a function of holding the detachable ink tank H1900, and has a first hole H1503 to be engaged with a second claw H1910 of the ink tank H1900.

The ink supply member H1500 is also provided with a mounting guide H1601 for guiding the recording head cartridge H1000 to a mounting position of the carriage M4001 in the ink jet recording apparatus main body; an engaging portion H1508 for mounting and fixing the recording head cartridge to the carriage M4001 by means of a headset lever; and a butting portion H1509 in an X direction (carriage scan direction), a butting portion H1510 in a Y direction (recording media conveying direction), and a butting portion H1511 in a Z direction (ink discharge direction) for positioning the cartridge to a predetermined mounting position of the carriage M4001. The ink supply member H1500 is also provided with a terminal fixing portion H1512 for positioning and fixing the electric contact substrate H2200 of the recording element unit H1002. Multiple ribs are arranged in and around the terminal fixing portion H1512 to increase the rigidity of the surface having the terminal fixing portion H1512.

(1-3) Coupling of the Recording Head Unit and the Ink Supply Unit

As shown in FIG. 4 described above, the recording head H1001 is completed by coupling the recording element unit H1002 to the ink supply unit H1003 and to the tank holder H2000. The coupling is performed as follows.

In order that the ink supply ports of the recording element unit H1002 (the ink supply ports H1201 of the first plate H1200) and the ink supply ports of the ink supply unit H1003 (the ink supply ports H1601 of the flow path forming member H1600) may communicate with each other without ink leak, the respective members are fixed with screws H2400 through the joint rubber H2300 by means of contact bonding. Simultaneously with the fixing, the recording element unit H1002 is accurately positioned and fixed with respect to the home positions in the X, Y, and Z direction of the ink supply unit.

Figure 9:
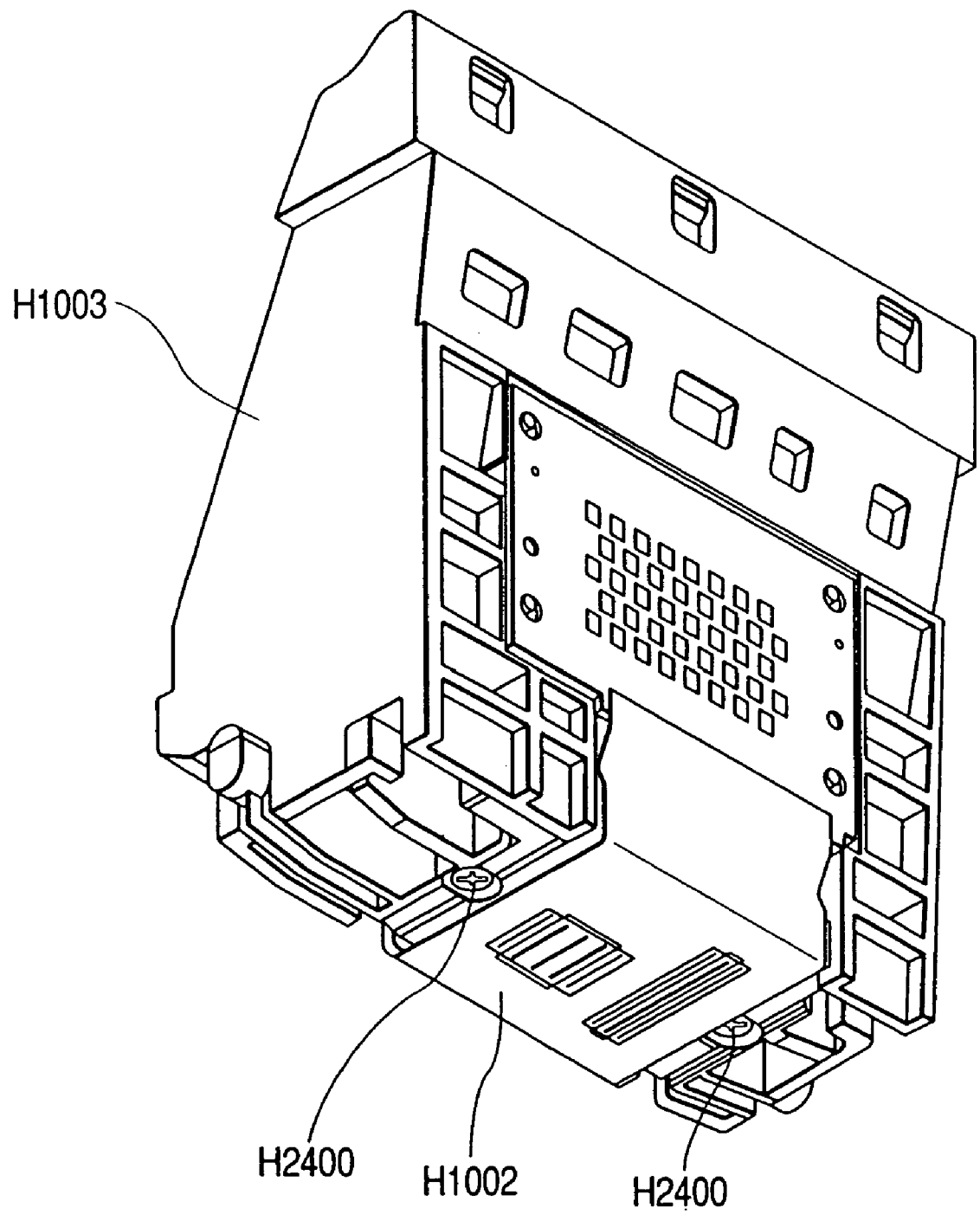
FIG. 9 is a perspective view showing a state where a recording element unit of the recording head cartridge shown in each of FIGS. 3A and 3B and an ink supply unit are assembled.

Then, the electric contact substrate H1301 of the recording element unit H1002 is positioned and fixed to one side of the ink supply member H1500 with terminal positioning pins H1515 (two points) and terminal positioning holes H1309 (two points). The substrate is fixed by, for example, crimping the terminal bonding pins H1515 arranged on the ink supply member H1500, but may be fixed by means of other fixing means. FIG. 9 shows a final drawing.

Figure 10:
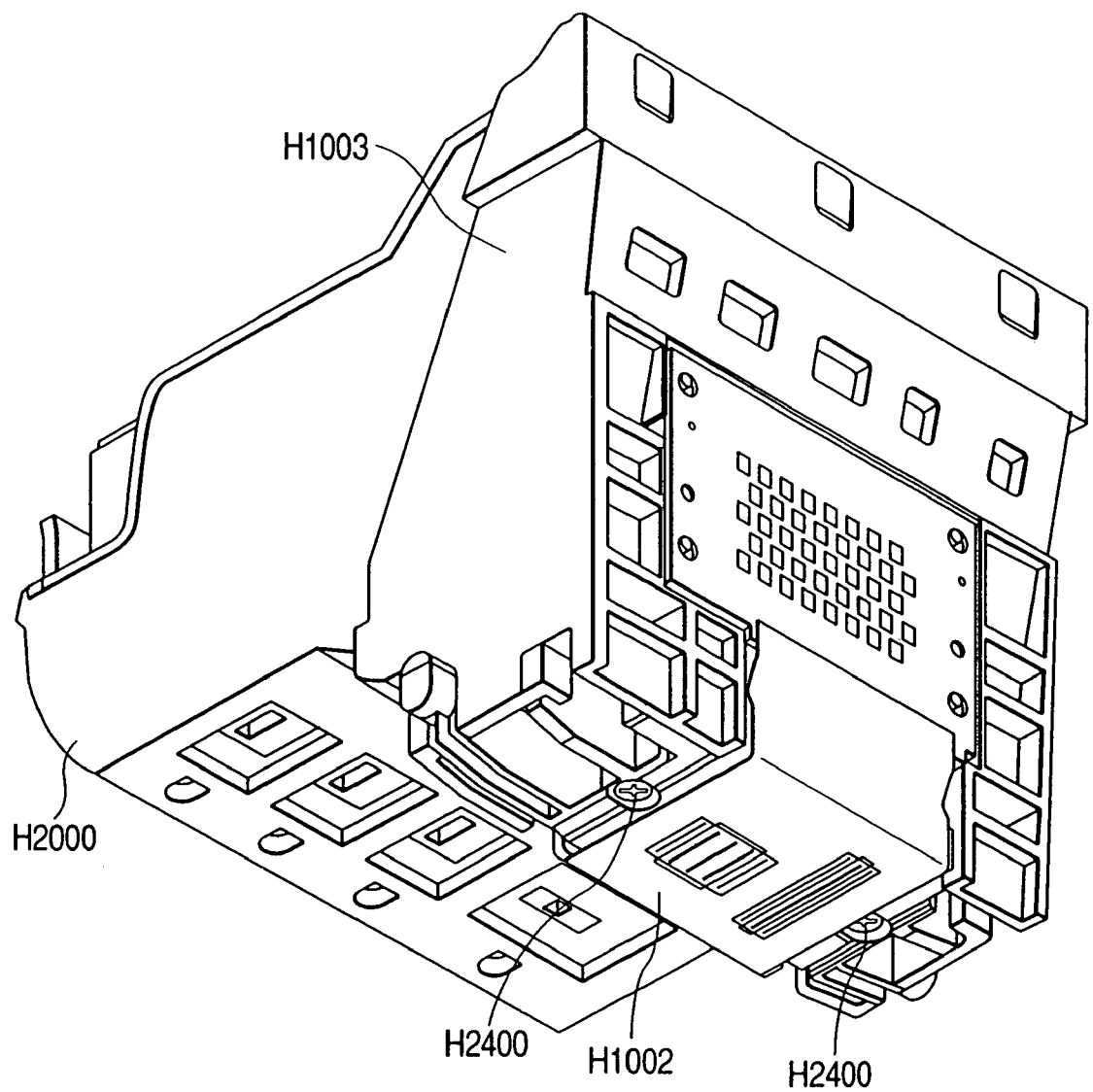
FIG. 10 is a perspective view showing a bottom surface side of the recording head cartridge shown in each of FIGS. 3A and 3B.

Furthermore, coupling holes and coupling portions of the ink supply member H1500 with the tank holder H2000 are fitted into and coupled with the tank holder, whereby the recording head H1001 is completed. FIG. 10 shows a final drawing.

(2) Recording Head Cartridge

FIGS. 3A and 3B described above are views for explaining the recording head H1001 composing the recording head cartridge H1000 and how the ink tanks H1901, H1902, H1903, and H1904 are mounted. Each of the ink tanks H1901, H1902, H1903, and H1904 stores in it an ink of a corresponding color. As shown in FIG. 8, each of the ink tanks has an ink supply port H1907 for supplying the ink in the ink tank to the recording head H1001. For example, when the ink tank H1901 is mounted on the recording head H1001, the ink supply port H1907 of the ink tank H1901 is brought into press contact with the filter H1700 placed at the joint portion H1520 of the recording head H1001. Thus, the black ink in the ink tank H1901 passes through the first plate H1200 from the ink supply port H1907 via the ink flow path H1501 of the recording head H1001 to be supplied to the first recording element substrate.

Then, the ink is supplied to a bubbling chamber H1109 provided with the electrothermal converting elements H1103 and the discharge ports H1107, and is discharged toward recording paper as a recording medium by thermal energy applied to the electrothermal converting elements H1103.

EXAMPLES

Hereinafter, the present invention will be described in more detail by way of examples and comparative examples. However, the present invention is not limited to the following examples without departing from its gist. Unless otherwise stated, the term "%" in the following description means "mass %".

<Preparation of Inks of Examples 1 to 3 and Comparative Examples 1 to 5>

The components shown in Table 1 below were mixed, sufficiently stirred, and dissolved. After that, the solution was filtered through a microfilter having a pore size of 0.2 μm (manufactured by Fuji Photo Film Co., Ltd.) under pressure, and the pH of the filtrate was adjusted as required to prepare an ink of each of Examples 1 to 3 and Comparative Examples 1 to 5.

TABLE 1

|  | Example | | | Comparative Example | | | | |
| --- | --- | --- | --- | --- | --- | --- | --- | --- |
|  | 1 | 2 (*1) | 3 | 1 | 2 | 3 | 4 | 5 |
| Compound represented by the following structural formula 1-1 | 3.0 | 3.0 |  | 3.0 | 3.0 |  | 3.0 | 3.0 |
| Compound represented by the following structural formula 1-2 |  |  | 3.0 |  |  | 3.0 |  |  |
| Compound represented by the following structural formula 2 (*2) | 0.1 | 0.1 | 0.2 |  |  |  |  |  |
| C.I. Acid Blue 9 |  |  |  |  |  |  |  | 0.1 |
| Glycerin | 7.0 | 7.0 | 7.0 | 7.0 | 7.0 | 7.0 | 7.0 | 7.0 |
| Diethylene glycol | 5.0 | 5.0 | 5.0 | 5.0 | 5.0 | 5.0 | 5.0 | 5.0 |
| Trimethylolpropane | 7.0 | 7.0 | 7.0 | 7.0 | 7.0 | 7.0 | 7.0 | 7.0 |
| Triethanolamine |  |  |  |  | 0.1 | 0.2 |  |  |
| Compound represented by the following structural formula 3 | 1.0 | 1.0 | 1.0 |  | 1.0 | 1.0 | 1.0 | 1.0 |
| Compound represented by the following structural formula 4 |  |  |  | 1.0 |  |  |  |  |
| Water | 76.9 | 76.9 | 76.8 | 77.0 | 76.9 | 76.8 | 77.0 | 76.9 |

(*1) The pH was adjusted to 7.5 with a 4N aqueous solution of LiOH.
(*2) A mixture of an Li salt and an Na salt (molar ratio Li salt:Na salt = 2:1).
Structural formulae 1-1 and 1-2

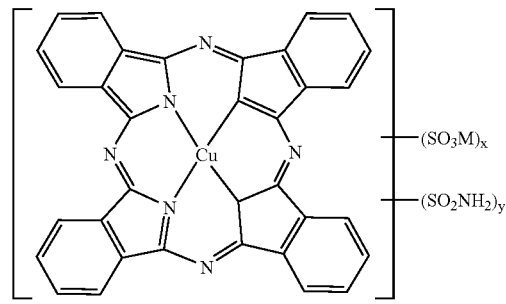

(In the structural formulae 1-1 and 1-2, M represents Na, and x and y each independently represent an integer of 1 to 4.)

Each of the compounds represented by the structural formulae 1-1 and 1-2 is C.I. Direct Blue 199. C.I. Direct Blue 199 is a mixture of compounds different from each other in positions and number of substituents. Therefore, the absorption spectra of aqueous solutions of the compounds represented by the structural formulae 1-1 and 1-2 contained in C.I. Direct Blue 199 are different from each other. Here, a 1-mass % aqueous solution of each of the compounds represented by the structural formulae 1-1 and 1-2 was diluted with pure water by 1,000-fold, and its absorption spectrum was measured in accordance with JIS K 0115 under the following conditions.

Equipment used; spectrophotometer (U-3000 manufactured by Hitachi, Ltd.)

Cell; quartz cell (having an optical path length of 10 mm)
Measurement Temperature; 25° C.

The ration of a peak value in the wavelength range of 600 nm to 640 nm and a peak value in the wavelength range of 650 nm to 680 nm of the compounds represented by the structural formulae 1-1 and 1-2 were determined from the respective absorption spectra of the compounds thus measured.

Structural formula 1-1: $B/A = 0.67$

Structural formula 1-2: $B/A = 0.50$ (In the equations, 'A' represents a peak value of the absorption spectrum in the wavelength range of 600 nm to 640 nm, and 'B' represents a peak value of the absorption spectrum in the wavelength range of 650 nm to 680 nm.)

Structural formula 2

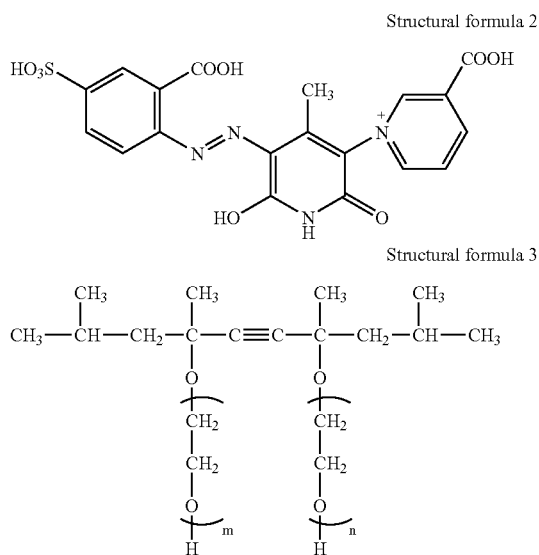

Structural formula 3

(In the structural formula 3, m+n=10. In the present invention, Acetylenol EH (trade name) manufactured by Kawaken Fine Chemicals Co., Ltd. was used as a compound in the structural formula 3.)

Structural formula 4

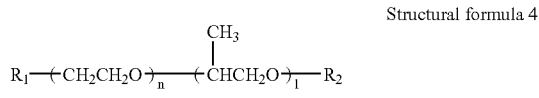

(In the structural formula 4, $R_1$ and $R_2$ each independently represent an alkyl group or a hydrogen atom, n=10, and l=7.)

<Evaluation of Examples 1 to 3 and Comparative Examples 1 to 5>

Each of the resultant inks was charged into an ink cartridge for a PIXUS 950i manufactured by CANON Inc., and an image was formed by means of the PIXUS 950i manufactured by CANON Inc. Each ink and the formed image were evaluated for the following evaluation items. Table 2 shows the results of the evaluation.

Storage pH Stability

An initial pH was measured after an ink was prepared. The ink was hermetically sealed in a Teflon container equipped with a cap, and the container was stored in a thermostatic bath at 60° C. for 3 months. After that, the ink was taken out and cooled to room temperature. Then, a pH after the storage was measured. Then, a pH variation was determined from the initial pH value and the pH value after the storage. The evaluation criteria for storage pH stability are as follows.

A: pH variation is 1.6 or less.

B: pH variation exceeds 1.6.

Bronzing occurrence property

In general, a bronzing is more remarkably observed as an ejected and applied ink density (duty) is higher. An ink was applied to an HG-201 (glossy film) manufactured by CANON Inc. as a recording medium in such a manner that the ejected and applied ink density (duty) would increase in increments of 5% in the range of 0 to 100%, to thereby form a printed product. The highest duty at which a bronzing started to occur in the resultant printed product was used as an indication of bronzing occurrence property. That is, an ink having a higher duty at which a bronzing occurs can be said to be an ink that causes less bronzing.

TABLE 2

|  |  | pH | | Storage | Bronzing | |
|  |  | Initial | After storage | pH stability | occurrence duty (%) | General evaluation |
|---|---|---|---|---|---|---|
| Example | 1 | 7.02 | 5.85 | A | 100 | Good |
|  | 2 | 7.50 | 5.95 | A | 100 | Good |
|  | 3 | 6.95 | 5.90 | A | 100 | Good |
| Comparative Example | 1 | 7.05 | 5.25 | B | 75 | Bad(Occurrence of bronzing) |
|  | 2 | 8.70 | 8.00 | A | 90 | Bad(Occurrence of bronzing, High pH) |
|  | 3 | 9.54 | 8.05 | A | 60 | Bad(Occurrence of bronzing, High pH) |
|  | 4 | 7.07 | 5.85 | A | 75 | Bad(Occurrence of bronzing) |
|  | 5 | 7.04 | 5.85 | A | 75 | Bad(Occurrence of bronzing) |

<Preparation of Inks of Examples 4 to 14 and Comparative Example 6>

The components shown in Table 3 below were mixed, sufficiently stirred, and dissolved. After that, the solution was filtered through a microfilter having a pore size of 0.2 μm (manufactured by Fuji Photo Film Co., Ltd.) under pressure, and the pH of the filtrate was adjusted as required to prepare an ink of each of Examples 4 to 14 and Comparative Example 6.

TABLE 3

|  | Example | | | | | | | | | | | Comparative Example |
|---|---|---|---|---|---|---|---|---|---|---|---|---|
|  | 4 | 5 | 6 | 7 | 8 | 9 | 10 | 11 | 12 | 13 | 14 | 6 |
| Compound represented by the following structural formula 1-3 |  | 3.0 |  |  |  |  |  |  |  |  |  |  |
| Compound represented by the following structural formula 1-4 | 3.0 |  |  | 3.0 | 3.0 | 3.0 | 3.0 | 0.4 | 0.5 | 5.0 | 5.1 | 3.0 |
| Compound represented by the following structural formula 1-5 |  |  | 3.0 |  |  |  |  |  |  |  |  |  |

TABLE 3-continued

|  | Example | | | | | | | | | | | Comparative Example |
|---|---|---|---|---|---|---|---|---|---|---|---|---|
|  | 4 | 5 | 6 | 7 | 8 | 9 | 10 | 11 | 12 | 13 | 14 | 6 |
| Compound represented by the above structural formula 2 (*3) | 0.2 | 0.2 | 0.2 | 0.1 | 0.09 | 3.0 | 3.1 | 0.2 | 0.2 | 0.2 | 0.2 |  |
| Glycerin | 7.0 | 7.0 | 7.0 | 7.0 | 7.0 | 7.0 | 7.0 | 7.0 | 7.0 | 7.0 | 7.0 | 7.0 |
| Diethylene glycol | 5.0 | 5.0 | 5.0 | 5.0 | 5.0 | 5.0 | 5.0 | 5.0 | 5.0 | 5.0 | 5.0 | 5.0 |
| Trimethylolpropane | 7.0 | 7.0 | 7.0 | 7.0 | 7.0 | 7.0 | 7.0 | 7.0 | 7.0 | 7.0 | 7.0 | 7.0 |
| Compound represented by the above structural formula 3 | 1.0 | 1.0 | 1.0 | 1.0 | 1.0 | 1.0 | 1.0 | 1.0 | 1.0 | 1.0 | 1.0 | 1.0 |
| Water | 76.8 | 76.8 | 76.8 | 76.9 | 76.91 | 74.0 | 73.9 | 79.4 | 79.3 | 74.8 | 74.7 | 77.0 |

(*3) A mixture of an Li salt and an Na salt (molar ratio Li salt:Na salt = 2:1).
Structural formulae 1-3, 1-4, and 1-5

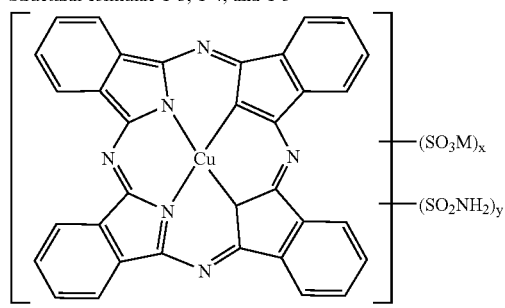

(In the structural formulae 1-3, 1-4, and 1-5, M represents Na, and x and y each independently represent an integer of 1 to 4.)

Each of the compounds represented by the structural formulae 1-3, 1-4, and 1-5 is C.I. Direct Blue 199 as in the case of each of the structural formulae 1-1 and 1-2. A 1-mass % aqueous solution of each of the compounds represented by the structural formulae 1-3, 1-4, and 1-5 was diluted with pure water by 1,000-fold, and its absorption spectrum was measured in accordance with JIS K 0115 under the following conditions. Then, the ratio (B/A) between a peak value in the wavelength range of 600 nm to 640 nm and a peak value in the wavelength range of 650 nm to 680 nm was determined.

Structural formula 1-3: A peak is present only in the wavelength range of 600 nm to 640 nm.

$B/A = 0.74$      Structural formula 1-4:

$B/A = 0.75$      Structural formula 1-5:

(In the equations, 'A' represents a peak value of the absorption spectrum in the wavelength range of 600 nm to 640 nm, and 'B' represents a peak value of the absorption spectrum in the wavelength range of 650 nm to 680 nm.)

<Evaluation of Examples 4 to 14 and Comparative Example 6>

Each of the resultant inks was charged into an ink cartridge for a PIXUS 950i manufactured by CANON Inc., and an image was formed by means of the PIXUS 950i manufactured by CANON Inc. Each ink and the formed image were evaluated for the following evaluation items. Table 4 shows the results of the evaluation.

Bronzing Occurrence Property

Ink was applied to an HG-201 (glossy film) manufactured by CANON Inc. as a recording medium in such a manner that the ejected and applied ink density (duty) would increase in increments of 5% in the range of 0 to 100%, to thereby form a printed product. The highest duty at which a bronzing started to occur in the resultant printed product was used as an indication of bronzing occurrence property. The evaluation criteria for bronzing occurrence property are as follows.

AA: no bronzing occurs even at 100% duty.
A: bronzing occurrence duty is 95% or more.
B: bronzing occurrence duty is 80% or more and less than 95%.
C: bronzing occurrence duty is less than 80%.

Gas Resistance

A printed product with an ejected and applied ink density (duty) of 100% was formed by means of an PR-101 (glossy paper) manufactured by CANON Inc. as a recording medium. A color difference ΔE was calculated from the resultant printed product according to the following method, to thereby evaluate the printed product for gas resistance. The evaluation method and criteria for gas resistance are as follows.

Evaluation equipment; ozone fade meter Exposure conditions; exposure for 2 hours at a temperature inside a thermostatic bath of 40° C. and a relative humidity of 55% in an ozone atmosphere having a concentration of 3 ppm.

Evaluation method; CIE L*a*b*'s of a test sample before and after the exposure were measured. The color difference ΔE was calculated from the following equation.

TABLE 4

|  |  | Bronzing occurrence property | Gas resistance |
|---|---|---|---|
| Example | 4 | AA | AA |
|  | 5 | AA | A |
|  | 6 | A | AA |

TABLE 4-continued

|  | Bronzing occurrence property | Gas resistance |
|---|---|---|
| 7 | AA | AA |
| 8 | A | AA |
| 9 | AA | AA |
| 10 | AA | AA |
| 11 | AA | A |
| 12 | AA | AA |
| 13 | AA | AA |
| 14 | A | AA |
| Comparative Example 6 | C | AA |

$\Delta E = (\Delta L^{*2} + \Delta a^{*2} + \Delta b^{*2})^{1/2}$
AA: $\Delta E$ is less than 20.
A: $\Delta E$ is 20 or more and less than 25.
B: $\Delta E$ is 25 or more and less than 30.
C: $\Delta E$ is 30 or more.

In each of Examples 4, 7, 8, 9, and 10, the ejected and applied ink density (duty) was increased up to 200% to confirm the bronzing occurrence property. As a result, a tendency was observed, in which a bronzing occurs less frequently as the content of the compound represented by the structural formula 2 with respect to the total mass of an ink jet recording ink is higher. However, comparison between the results of Examples 9 and 10 shows that nearly no difference in bronzing occurrence property is observed when the content of the compound represented by the structural formula 2 exceeds 3 mass %.

<Preparation of Inks of Examples 15 to 26>

The components shown in Table 5 below were mixed, sufficiently stirred, and dissolved. After that, the solution was filtered through a microfilter having a pore size of 0.2 μm (manufactured by Fuji Photo Film Co., Ltd.) under pressure, and the pH of the filtrate was adjusted as required to prepare an ink of each of Examples 15 to 26.

TABLE 5

|  | Example | | | | | | | | | | | |
|---|---|---|---|---|---|---|---|---|---|---|---|---|
|  | 15 | 16 | 17 | 18 | 19 | 20 | 21 | 22 | 23 | 24 | 25 | 26 |
| Compound represented by the following structural formula 1-6 (*4) | 1.0 | 1.0 | 1.0 | 1.0 | 1.0 | 1.0 | 1.0 | 1.0 | 1.0 | 1.0 | 1.0 | 1.0 |
| Compound represented by the above structural formula 2 (*5) | 3.0 | 3.0 | 3.0 | 3.0 | 3.0 | 3.0 | 3.0 | 3.0 | 3.0 | 3.0 | 3.0 | 3.0 |
| Glycerin | 7.5 | 7.5 | 7.5 | 7.5 | 7.5 | 10.0 | 5.0 | 15.0 | 5.0 | 10.0 |  |  |
| 1,5-pentanediol | 7.5 | 7.5 | 7.5 | 5.0 | 5.0 | 10.0 | 6.0 | 10.0 | 10.0 | 4.0 | 4.0 |  |
| Ethylene glycol | 5.0 |  |  |  | 5.0 | 8.0 | 12.0 |  | 8.0 | 8.0 |  |  |
| 2-pyrrolidone |  | 5.0 |  |  |  |  |  |  |  |  | 5.0 | 5.0 |
| Ethylene urea |  |  | 6.0 | 12.0 |  |  |  |  |  |  |  |  |
| Propylene glycol |  |  |  |  |  |  |  |  |  |  | 5.0 | 2.0 |
| N-methylpyrrolidone |  |  |  |  |  |  |  |  |  |  | 6.0 | 8.0 |
| Thiodiglycol |  |  |  |  |  |  |  |  |  |  |  | 15.0 |
| Diethylene glycol |  |  |  |  |  |  |  |  |  |  |  |  |
| Trimethylolpropane |  |  |  |  |  |  |  |  |  |  |  |  |
| Triethanolamine |  |  |  |  |  |  |  |  |  |  |  |  |
| Compound represented by the above structural formula 3 | 1.0 | 1.0 | 1.0 | 1.0 | 1.0 | 1.0 | 1.0 | 1.0 | 1.0 | 1.0 | 1.0 | 1.0 |
| Water | 75.0 | 75.0 | 74.0 | 70.5 | 77.5 | 67.0 | 72.0 | 70.0 | 72.0 | 73.0 | 75.0 | 65.0 |

(*4) $(x + y = 4)/(x + y = 3) = 2.3$
(*5) A mixture of an Li salt and an Na salt (molar ratio Li salt:Na salt = 2:1)
Structural formula 1-6

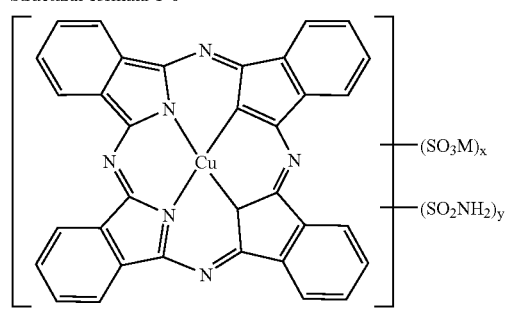

(In the structural formula 1-6, x and y each independently represent an integer of 1 to 4.)

<Evaluation of Examples 15 to 26>

Each of the resultant inks was charged into an ink cartridge for a PIXUS 950i manufactured by CANON Inc., and was evaluated for the following evaluation items by means of the PIXUS 950i manufactured by CANON Inc. It should be noted that the PIXUS 950i was modified so as to have a fine nozzle having a nozzle diameter of less than 20 µm and a liquid droplet volume of less than 4.5 pl.

Start-up Ejection Stability

A vertical ruler line was printed at a constant discharge suspension time interval in an environment of a temperature of 15° C. and a relative humidity of 10% under such a condition that the temperature of the ink at an ink jet nozzle portion would not increase. A vertical ruler line formed immediately after the suspension was observed with a micrometer having an object magnification of 50, and was evaluated according to the following criteria. The evaluation criteria for start-up ejection stability are as follows.

A: vertical ruler line has no disorder and can be properly printed.

B: vertical ruler line is slightly disordered but has no failure of discharge.

C: Failure of discharge and disorder are clearly observed in a vertical ruler line, and the line cannot be properly printed.

Stick Recoverability

A recording head for a PIXUS 950i on which an ink cartridge filled with ink had been mounted (modified head in which a tank and a holder were integrated) was removed from the main body of the recording apparatus with the ink cartridge being mounted on the head, after it was confirmed that all the nozzles of the head were able to print letters. Then, the recording head was left standing in a thermostatic bath having a temperature of 35° C. and a relative humidity of 10% for 2 weeks. The recording head was mounted on the printer again, and an recovering ejection operation by suction was performed. The number of recovering ejection operations by suction necessary for enabling all the nozzles of the recording head to print letters was used for evaluation. The evaluation criteria for stick recoverability are as follows.

A: not more than 2 suctions enable all nozzles of a recording head to print letters.

B: 3 to 6 suctions enable all nozzles of a recording head to print letters.

C: even 7 or more suctions do not enable all nozzles of a recording head to print letters.

High-speed Printing Discharge Stability

Each ink was used to perform solid printing with an ejected and applied ink density (duty) of 100% on an A4-size recording medium. The ink supply rate to a nozzle (refill rate) at this time was judged from a printing condition, and evaluation of high-speed printing discharge stability was performed. The evaluation criteria for high-speed printing discharge stability are as follows.

TABLE 6

|         |    | Start-up ejection stability | Stick recoverability | High-speed printing discharge stability |
|---------|----|-----------------------------|----------------------|-----------------------------------------|
| Example | 15 | A | A | A |
|         | 16 | A | A | A |
|         | 17 | A | A | A |
|         | 18 | A | A | A |
|         | 19 | B | C | A |
|         | 20 | A | A | B |
|         | 21 | A | C | A |
|         | 22 | A | B | B |
|         | 23 | A | C | A |
|         | 24 | C | C | A |
|         | 25 | C | C | A |
|         | 26 | C | C | A |

A: letters can be printed without any problem.

B: shifted printing, blur, failure of discharge, or the like occurs owing to an insufficient refill rate.

C: A refill rate is so low that a condition where all nozzles do not discharge ink is observed.

<Preparation of Inks of Examples 27 to 44>

The components shown in Table 7 below were mixed, sufficiently stirred, and dissolved. After that, the solution was filtered through a microfilter having a pore size of 0.2 µm (manufactured by Fuji Photo Film Co., Ltd.) under pressure, and the pH of the filtrate was adjusted as required to prepare an ink of each of Examples 27 to 44.

TABLE 7

|  | Example | | | | | | | | |
|---|---|---|---|---|---|---|---|---|---|
|  | 27 | 28 | 29 | 30 | 31 | 32 | 33 | 34 | 35 |
| Compound represented by the above structural formula 1-1 | 0.8 | 0.8 | 0.8 | 0.8 | 0.8 | 0.8 | 0.8 | 0.8 | 4.9 |
| Compound represented by the above structural formula 2 (*6) | 2.8 | 2.8 | 2.8 | 2.8 | 2.8 | 2.8 | 2.8 | 2.8 | 0.1 |
| Glycerin | 7.5 | 12.0 | 6.0 | 10.0 | 8.0 | 10.0 | 7.5 | 7.5 | 7.5 |
| 1,5-pentanediol | 7.5 | 6.0 | 6.0 | 10.0 | 6.0 | 8.0 | 7.5 | 7.5 | 7.5 |
| Ethylene urea | 6.5 | 4.0 | 12.0 | 4.0 | 4.0 | 9.0 |  |  | 6.5 |
| Ethylene glycol |  |  |  |  |  |  | 6.5 |  |  |
| 2-pyrrolidone |  |  |  |  |  |  |  | 6.5 |  |
| Isopropyl alcohol | 2.5 | 2.5 | 2.5 | 2.5 | 2.5 | 2.5 | 2.5 | 2.5 | 2.5 |
| Compound represented by the above structural formula 3 | 1.0 | 1.0 | 1.0 | 1.0 | 1.0 | 1.0 | 1.0 | 1.0 | 1.0 |
| Water | 71.4 | 70.9 | 68.9 | 68.9 | 74.9 | 65.9 | 71.4 | 71.4 | 70.0 |
| Total of three kinds of solvents | 21.5 | 22.0 | 24.0 | 24.0 | 18.0 | 27.0 | 21.5 | 21.5 | 21.5 |
| First solvent + Second solvent (*8) | 15.0 | 18.0 | 12.0 | 20.0 | 14.0 | 18.0 | 15.0 | 15.0 | 15.0 |

TABLE 7-continued

| First solvent/Second solvent (*9) | 1.0 | 2.0 | 1.0 | 1.0 | 1.3 | 1.3 | 1.0 | 1.0 | 1.0 |
|---|---|---|---|---|---|---|---|---|---|
| | Example | | | | | | | | |
| | 36 | 37 | 38 | 39 | 40 | 41 | 42 | 43 | 44 |
| Compound represented by the above structural formula 1-1 | 4.8 | 0.8 | 0.8 | 0.8 | 0.8 | 0.8 | 0.8 | 0.8 | 0.8 |
| Compound represented by the above structural formula 2 (*6) | 0.2 | 3.5 | 3.6 | 2.8 | 2.8 | 2.8 | 2.8 | 2.8 | 2.8 |
| Glycerin | 7.5 | 7.5 | 7.5 | 6.8 | 12.0 | 6.0 | 11.0 | 8.0 | 10.0 |
| 1,5-pentanediol | 7.5 | 7.5 | 7.5 | 7.5 | 5.7 | 5.0 | 10.0 | 6.0 | 9.0 |
| Ethylene urea | 6.5 | 6.5 | 6.5 | 6.5 | 4.0 | 12.0 | 4.0 | 3.0 | 9.0 |
| Ethylene glycol | | | | | | | | | |
| 2-pyrrolidone | | | | | | | | | |
| Isopropyl alcohol | 2.5 | 2.5 | 2.5 | 2.5 | 2.5 | 2.5 | 2.5 | 2.5 | 2.5 |
| Compound represented by the above structural formula 3 | 1.0 | 1.0 | 1.0 | 1.0 | 1.0 | 1.0 | 1.0 | 1.0 | 1.0 |
| Water | 70.0 | 70.7 | 70.6 | 72.1 | 71.2 | 69.9 | 67.9 | 75.9 | 64.9 |
| Total of three kinds of solvents | 21.5 | 21.5 | 21.5 | 20.8 | 21.7 | 23.0 | 25.0 | 17.0 | 28.0 |
| First solvent + Second solvent (*8) | 15.0 | 15.0 | 15.0 | 14.3 | 17.7 | 11.0 | 21.0 | 14.0 | 19.0 |
| First solvent/Second solvent (*9) | 1.0 | 1.0 | 1.0 | 0.9 | 2.1 | 1.2 | 1.1 | 1.3 | 1.1 |

(*6) A mixture of an Li salt and an Na salt (molar ratio Li salt:Na salt = 2:1).
(*7) The ratio of the total content of three kinds of solvents composed of a first solvent (glycerin), a second solvent (1,5-pentanediol), and a third solvent (one selected from ethylene urea, ethylene glycol, and 2-pyrrolidone) to the total mass of an ink.
(*8) The ratio of the total content of the first solvent (glycerin) and the second solvent (1,5-pentanediol) to the total mass of an ink.
(*9) The mass ratio of the content of the first solvent (glycerin) to the content of the second solvent (1, 5-pentanediol).

<Evaluation of Examples 27 to 44>

Each of the resultant inks was charged into an ink cartridge for a PIXUS 950i manufactured by CANON Inc., and an image was formed by means of the PIXUS 950i manufactured by CANON Inc. Each ink and the formed image were evaluated for the following evaluation items. It should be noted that the PIXUS 950i was modified so as to have a fine nozzle having a nozzle diameter of less than 20 µm and a liquid droplet volume of less than 4.5 pl.

Bronzing Occurrence Property

Ink was applied to an HG-201 (glossy film) manufactured by CANON Inc. as a recording medium in such a manner that the ejected and applied ink density (duty) would increase in increments of 5% in the range of 0 to 100%, to thereby form a printed product. The highest duty at which a bronzing started to occur in the resultant printed product was used as an indication of bronzing occurrence property. The evaluation criteria for bronzing occurrence property are as follows.

AA: no bronzing occurs even at 100% duty.
A: bronzing occurrence duty is 95% or more.
B: bronzing occurrence duty is 80% or more and less than 95%.
C: bronzing occurrence duty is less than 80%.

Start-Up Ejection Stability

A vertical ruler line was printed at a constant discharge suspension time interval in an environment of a temperature of 15° C. and a relative humidity of 10% under such a condition that the temperature of an ink at an ink jet nozzle portion would not increase. A vertical ruler line formed immediately after the suspension was observed with a micrometer having an object magnification of 50, and was evaluated according to the following criteria. The evaluation criteria for start-up ejection stability are as follows.

A: vertical ruler line has no disorder and can be properly printed.
B: vertical ruler line is slightly disordered but has no failure of discharge.
C: failure of discharge and disorder are clearly observed in a vertical ruler line, and the line cannot be properly printed.

Stick Recoverability

A recording head for a PIXUS 950i on which an ink cartridge filled with ink had been mounted (modified head in which a tank and a holder were integrated) was removed from the main body of the recording apparatus with the ink cartridge being mounted on the head, after it was confirmed that all the nozzles of the head were able to print letters. Then, the recording head was left standing in a thermostatic bath having a temperature of 35° C. and a relative humidity of 10% for 2 weeks. The recording head was mounted on the printer again, and an recovering ejection operation by suction was performed. The number of recovering ejection operations by suction necessary for enabling all the nozzles of the recording head to print letters was used for evaluation. The evaluation criteria for stick recoverability are as follows.

AA: 1 suction enables all nozzles of a recording head to print letters.
A: 2 suctions enable all nozzles of a recording head to print letters.
B: 3 to 6 suctions enable all nozzles of a recording head to print letters.
C: even 7 or more suctions do not enable all nozzles of a recording head to print letters.

High-Speed Printing Discharge Stability

Each ink was used to perform solid printing with an ejected and applied ink density (duty) of 100% on an A4-size recording medium. The rate at which a nozzle was supplied with the ink-(refill rate) at this time was judged from a printing condition, and evaluation of high-speed printing discharge stability was performed. The evaluation criteria for high-speed printing discharge stability are as follows.

TABLE 8

|  | Bronzing occurrence property | Start-up ejection stability | Stick recoverability | High-speed printing discharge stability |
|---|---|---|---|---|
| Example 27 | AA | AA | AA | AA |
| 28 | AA | AA | AA | AA |
| 29 | AA | AA | A | AA |
| 30 | AA | A | AA | A |
| 31 | AA | AA | AA | AA |
| 32 | AA | AA | AA | A |
| 33 | AA | A | AA | AA |
| 34 | AA | A | AA | AA |
| 35 | AA | AA | A | AA |
| 36 | AA | AA | AA | AA |
| 37 | AA | AA | AA | AA |
| 38 | AA | A | A | AA |
| 39 | AA | B | A | AA |
| 40 | AA | AA | C | AA |
| 41 | AA | AA | C | AA |
| 42 | AA | A | AA | B |
| 43 | AA | C | AA | AA |
| 44 | AA | A | AA | B |

AA: letters can be printed without any problem.

A: practically acceptable shifted printing occurs owing to an insufficient refill rate.

B: shifted printing, blur, failure of discharge, or the like occurs owing to an insufficient refill rate.

C: A refill rate is so low that a state where all nozzles do not discharge an ink is observed.

INDUSTRIAL APPLICABILITY

According to the present invention, there can be provided an ink which is excellent in gas resistance and is capable of preventing a so-called bronzing.

There can be also provided an ink which can provide a high-resolution and high-image-quality printed product excellent in brightness and chroma at high speed, and which provides start-up ejection stability and clogging property at the tip of a nozzle comparable to those of conventional inks containing urea or a derivative thereof even when the ink is used for a recording apparatus having a fine nozzle having a nozzle diameter of less than 20 μm and a flying liquid droplet volume of less than 4.5 pl.

This application claims priority from Japanese Patent Application Nos. 2004-114669 and 2004-114670 both filed on Apr. 8, 2004; which are hereby incorporated by reference herein.

What is claimed is:

1. An ink jet recording ink comprising at least a copper phthalocyanine dye represented by the following general formula (1) and a compound represented by the following general formula (2):

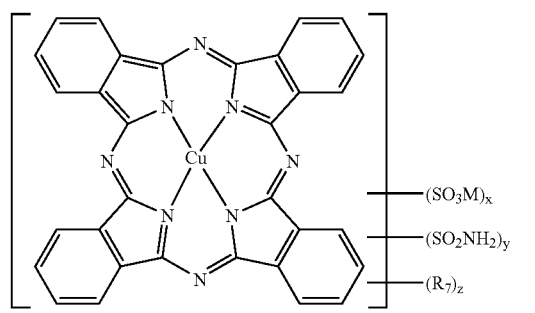

General formula (1)

wherein M represents an alkali metal or ammonium, $R^7$ represents OH, COOM, or $R_8$COOM in which $R_8$ represents an alkyl group having 4 to 9 carbon atoms and M represents an alkali metal or ammonium, and x, y, and z each independently represent an integer of 0 to 4,

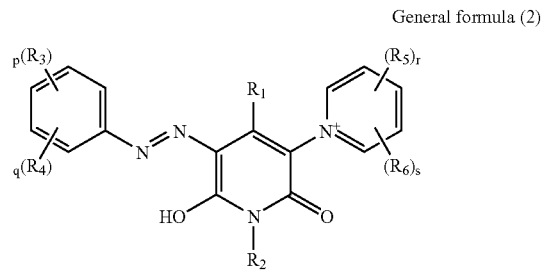

General formula (2)

wherein $R_1$ and $R_2$ each independently represent a substituted or unsubstituted alkyl group, aryl group, or arylalkyl group, or a hydrogen atom, $R_3$ and $R_5$ each independently represent a carboxyl group or a salt thereof, a sulfonic group or a salt thereof, a phosphate group or a salt thereof, or an alkyl group in which any one of these groups is substituted, $R_4$ and $R_6$ each independently represent a group except those defined for $R_3$ and $R_5$, p and r each independently represent an integer of 1 to 5, q and s each independently represent an integer of 0 to 4, and $p+q \leq 5$ and $r+s \leq 5$;

wherein the content of the compound represented by the general formula (2) is 0.1 mass % or more and 3.0 mass % or less with respect to the total mass of the ink jet recording ink;

wherein the content of the compound represented by the general formula (1) is 0.5 mass % or more and 5.0 mass % or less with respect to the total mass of the ink jet recording ink; and wherein an absorption spectrum of the copper phthalocyanine dye represented by the general formula (1) satisfies the following conditions (1) and (2):

(1) the absorption spectrum has peaks in both a wavelength range of 600 nm to 640 nm and a wavelength range of 650 nm to 680 nm, and (2) the ratio between peak values of the absorption spectrum satisfies the following relationship:

$$B/A < 0.75$$

wherein 'A' represents a peak value of the absorption spectrum in the wavelength range of 600 nm to 640 nm, and 'B' represents a peak value of the absorption spectrum in the wavelength range of 650 nm to 680 nm.

2. An ink jet recording ink according to claim 1, wherein the mass ratio of the content of the compound represented by the general formula (1) to the content of the compound represented by the general formula (2) is 15/1 or more and 50/1 or less.

3. An ink jet recording ink according to claim 1, wherein the ink has a pH in a range of 4 to 7.5.

4. An ink jet recording ink according to claim 1, further comprising 0.1 mass % to 1.5 mass % of an ethylene oxide adduct of acetylene glycol represented by the following general formula (3) with respect to the total mass of the ink jet recording ink, General formula (3)

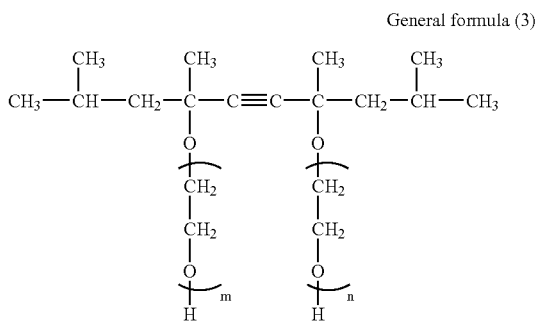

wherein m and n each independently represent an integer.

5. An ink jet recording ink according to claim 4, wherein m and n in the compound represented by the general formula (3) satisfy a relationship of 6<m+n<14.

6. An ink jet recording ink according to claim 1, further comprising at least three kinds of solvents including glycerin as a first solvent, a diol represented by the following general formula (4) as a second solvent, and one selected from a urea derivative represented by the following general formula (5), ethylene glycol, and 2-pyrrolidone as a third solvent, wherein the total content of the three kinds of solvents is 18 mass % or more and 27 mass % or less with respect to the total mass of the ink jet recording ink, the total content of the first and second solvents is 12 mass % or more and 20 mass % or less, and the mass ratio of the content of the first solvent to the content of the second solvent is 1.0 or more and 2.0 or less,

   General Formula (4)

wherein n represents an integer of 1 to 6,

General Formula (5)

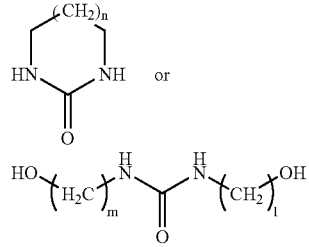

wherein n represents an integer of 0 to 5, and m and l each independently represent an integer of 1 to 6.

7. An ink jet recording ink according to claim 6, wherein the second solvent is 1,5-pentanediol.

8. An ink jet recording ink according to claim 6, wherein the urea derivative represented by the general formula (5) is ethylene urea.

9. An ink jet recording ink according to claim 6, wherein the content of the compound represented by the general formula (2) is 0.2 mass % or more and 3.0 mass % or less with respect to the total mass of the ink jet recording ink.

10. An ink jet recording ink according to claim 6, wherein the ink jet recording ink has a pH in a range of 5 to 7.5.

11. An ink jet recording method comprising applying the ink jet recording ink according to claim 1 to a recording medium by means of an ink jet head to form an image.

12. An ink cartridge comprising the ink jet recording ink according to claim 1 stored therein.

13. An ink jet recording apparatus comprising the ink jet recording ink according to claim 1 mounted thereon.

* * * * *

UNITED STATES PATENT AND TRADEMARK OFFICE
CERTIFICATE OF CORRECTION

PATENT NO. : 7,244,299 B2
APPLICATION NO. : 11/234307
DATED : July 17, 2007
INVENTOR(S) : Tsuji et al.

It is certified that error appears in the above-identified patent and that said Letters Patent is hereby corrected as shown below:

ON THE COVER PAGE

In Item (75), Inventors:
"Hiroyuki Takuhara, Tokyo" should read --Hiroyuki Takuhara, Machida--.

In Item (*), Notice:
After "Subject to any disclaimer, the term of this patent is extended or adjusted under 35 U.S.C. 154(b) by 0 days."
insert the following sentence:
--This patent is subject to a terminal disclaimer.--.

In Item (56), FOREIGN PATENT DOCUMENTS
"JP 2006/071822" should read --JP 2006-071822--.

COLUMN 3

Line 28, "ejection" should read --eject--.

COLUMN 7

Line 7, "HO—$CH_z$—$(CH_2)_n$—$CH_2$—OH" should read
--HO—$CH_2$—$(CH_2)_n$—$CH_2$—OH--.

COLUMN 10

Line 51, "a, cyan" should read --a cyan--.

COLUMN 12

Line 27, "will-be" should read --will be--.

COLUMN 19

Line 37, "the," should read --the--.

UNITED STATES PATENT AND TRADEMARK OFFICE
CERTIFICATE OF CORRECTION

PATENT NO. : 7,244,299 B2
APPLICATION NO. : 11/234307
DATED : July 17, 2007
INVENTOR(S) : Tsuji et al.

It is certified that error appears in the above-identified patent and that said Letters Patent is hereby corrected as shown below:

COLUMN 23

Line 66, "used;" should read --used:--.

COLUMN 24

Line 49, "cell;" should read --cell:--.

Line 50, "Temperature;" should read --Temperature:--.

COLUMN 28

Line 52, "equipment;" should read --equipment:--.

Lines 52-53, "meter Exposure con-ditions;" should read
--meter
Exposure conditions:--.

Line 56, "method;" should read --method:--.

COLUMN 29

Table 5, in (*5), "salt = 2.1" should read --salt = 2.1)--.

COLUMN 31

Line 21, "vertical" should read --Vertical--.

Line 23, "vertical" should read --Vertical--.

Line 38, "an" should read --a--.

UNITED STATES PATENT AND TRADEMARK OFFICE
CERTIFICATE OF CORRECTION

PATENT NO.        : 7,244,299 B2
APPLICATION NO.   : 11/234307
DATED             : July 17, 2007
INVENTOR(S)       : Tsuji et al.

It is certified that error appears in the above-identified patent and that said Letters Patent is hereby corrected as shown below:

COLUMN 32

Line 35, "letters" should read --Letters--.

Line 36, "shifted" should read --Shifted--.

COLUMN 34

Line 64, "ink-(refill rate)" should read --ink (refill rate)--.

COLUMN 35

Line 57, "April 8, 2004;" should read --April 8, 2004,--.

COLUMN 36

Line 18, "$R^7$" should read --$R_7$--.

Signed and Sealed this

Twenty-ninth Day of April, 2008

JON W. DUDAS
*Director of the United States Patent and Trademark Office*